(12) United States Patent
Rains, Jr. et al.

(10) Patent No.: US 9,137,879 B2
(45) Date of Patent: Sep. 15, 2015

(54) NETWORKED SYSTEM OF INTELLIGENT LIGHTING DEVICES WITH SHARING OF PROCESSING RESOURCES OF THE DEVICES WITH OTHER ENTITIES

(75) Inventors: Jack C. Rains, Jr., Herndon, VA (US); David P. Ramer, Reston, VA (US); Jason Rogers, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 529 days.

(21) Appl. No.: 13/564,519

(22) Filed: Aug. 1, 2012

(65) Prior Publication Data

US 2014/0035482 A1    Feb. 6, 2014

(51) Int. Cl.
H05B 37/02    (2006.01)

(52) U.S. Cl.
CPC ............ *H05B 37/0254* (2013.01); *Y02B 20/48* (2013.01)

(58) Field of Classification Search
USPC ................................................. 315/292, 291
See application file for complete search history.

(56) References Cited

U.S. PATENT DOCUMENTS

| | | | |
|---|---|---|---|
| 4,749,254 A | 6/1988 | Seaver | |
| 5,705,804 A | 1/1998 | Ramer et al. | |
| 5,769,527 A | 6/1998 | Taylor et al. | |
| 6,009,455 A | 12/1999 | Doyle | |
| 6,043,873 A | 3/2000 | Ramer et al. | |
| 6,363,434 B1 | 3/2002 | Eytchison | |
| 7,003,547 B1 | 2/2006 | Hubbard | |
| 7,333,903 B2 | 2/2008 | Walters et al. | |
| 7,546,167 B2 | 6/2009 | Walters et al. | |
| 8,130,371 B2 | 3/2012 | Imura | |
| 8,140,276 B2 | 3/2012 | Walters et al. | |
| 8,732,031 B2 * | 5/2014 | Martin et al. | 705/26.1 |
| 8,755,039 B2 * | 6/2014 | Ramer et al. | 356/213 |
| 2003/0057886 A1 * | 3/2003 | Lys et al. | 315/291 |
| 2006/0075407 A1 | 4/2006 | Powers et al. | |
| 2006/0075408 A1 | 4/2006 | Powers et al. | |

(Continued)

FOREIGN PATENT DOCUMENTS

WO    2011121470 A1    10/2011

OTHER PUBLICATIONS

"Introducing Philips hue: the world's smartest LED bulb, marking a new era in home lighting"; Philips Sense and Simplicity; http://www.newscenter/philips.com/main/standard/news/press/2012/20121029-Introducing- . . . ; Oct. 29, 2012; Amsterdam, The Netherlands.

(Continued)

*Primary Examiner* — Ryan Jager
(74) *Attorney, Agent, or Firm* — RatnerPrestia

(57) ABSTRACT

A system of network-connected lighting devices also offers a distributed processing function that utilizes processor and/or memory resources if/when available in some or all of the lighting devices. In the examples, a resource manager receives a job for distributed processing using shared available resources. The resource manager identifies lighting devices having resources of the processors and/or the memories available for the distributed processing function. The resource manager distributes tasks and/or data of the received job through a communications network to identified lighting devices, for distributed processing. The resource manager also receives results of distributed processing for the received job, from the identified lighting devices through the communications network. The received results are processed to produce a composite result for a response to the received job.

15 Claims, 7 Drawing Sheets

(56) References Cited

U.S. PATENT DOCUMENTS

| | | | |
|---|---|---|---|
| 2007/0045524 A1 | 3/2007 | Rains et al. | |
| 2007/0237284 A1* | 10/2007 | Lys et al. | 377/19 |
| 2008/0071933 A1* | 3/2008 | Nonaka et al. | 710/7 |
| 2008/0265799 A1* | 10/2008 | Sibert | 315/292 |
| 2009/0299527 A1* | 12/2009 | Huizenga et al. | 700/275 |
| 2010/0114340 A1* | 5/2010 | Huizenga et al. | 700/90 |
| 2010/0259931 A1 | 10/2010 | Chemel et al. | |
| 2010/0301769 A1 | 12/2010 | Chemel et al. | |
| 2012/0002406 A1 | 1/2012 | Leadford et al. | |
| 2012/0025717 A1 | 2/2012 | Klusmann et al. | |
| 2012/0040606 A1 | 2/2012 | Verfuerth | |
| 2012/0057050 A1* | 3/2012 | Ashdown | 348/234 |
| 2012/0086561 A1 | 4/2012 | Ilyes et al. | |

OTHER PUBLICATIONS

Chris Davies; "Philips hue Review"; SlashGear; http://www.slashgear.com/philips-hue-review-07255995/ . . . ; Nov. 7, 2012, London, United Kingdom.

"Raspberry Pi a $30 Computer set to Revolutionize the Teaching of Computing"; Silver-Fish hubpages; http://silver-fish.hubpages.com/hub/Raspberry-Pi-a-30-Computer; Aug. 15, 2012.

Entire patent prosecution history of U.S. Appl. No. 13/463,594, filed May 3, 2012, entitled "Lighting Devices With Integral Sensors for Detecting One or More External Conditions and Networked System Using Such Devices."

International Search Report and Written Opinion issued in PCT/US2013/050657, ABL IPHolding LLC, dated Jan. 9, 2014.

Entire prosecution history of U.S. Appl. No. 13/463,594, filed May 3, 2012, entitled "Lighting Devices With Sensors for Detecting One or More External Conditions and Networked System Using Such Devices."

Entire prosecution history of U.S. Appl. No. 14/285,881, filed May 23, 2014, entitled "Lighting Devices With Sensors for Detecting One or More External Conditions and Networked System Using Such Devices."

Entire prosecution history of U.S. Appl. No. 13/463,586, filed May 3, 2012, entitled "Networked Architecture for System of Lighting Devices Having Sensors, for Intelligent Applications."

International Search Report and Written Opinion of International Application No. PCT/US2013/037968 dated Jul. 2, 2013.

Non-final Office Action issued Aug. 26, 2013, in U.S. Appl. No. 13/463,594, filed May 3, 2012, entitled "Lighting Devices With Sensors for Detecting One or More External Conditions and Networked System Using Such Devices".

"Distributed Computing", Wikipedia, pp. 1-10, http://en.wikipedia.org/wiki/Distributed_computing, last edited Mar. 18, 2012.

Notice of Allowance issued in U.S. Appl. No. 13/463,586, dated Apr. 27, 2015.

* cited by examiner

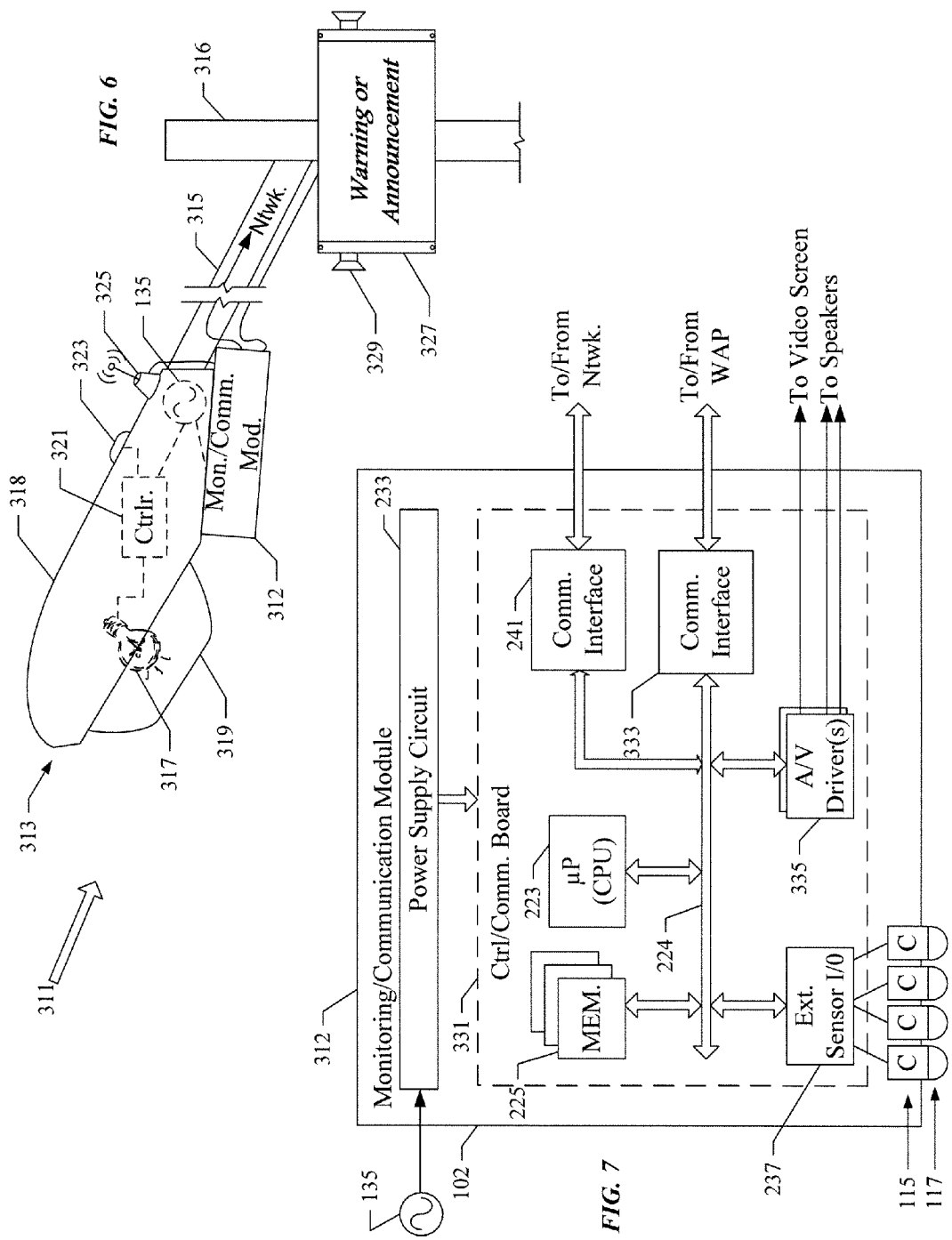

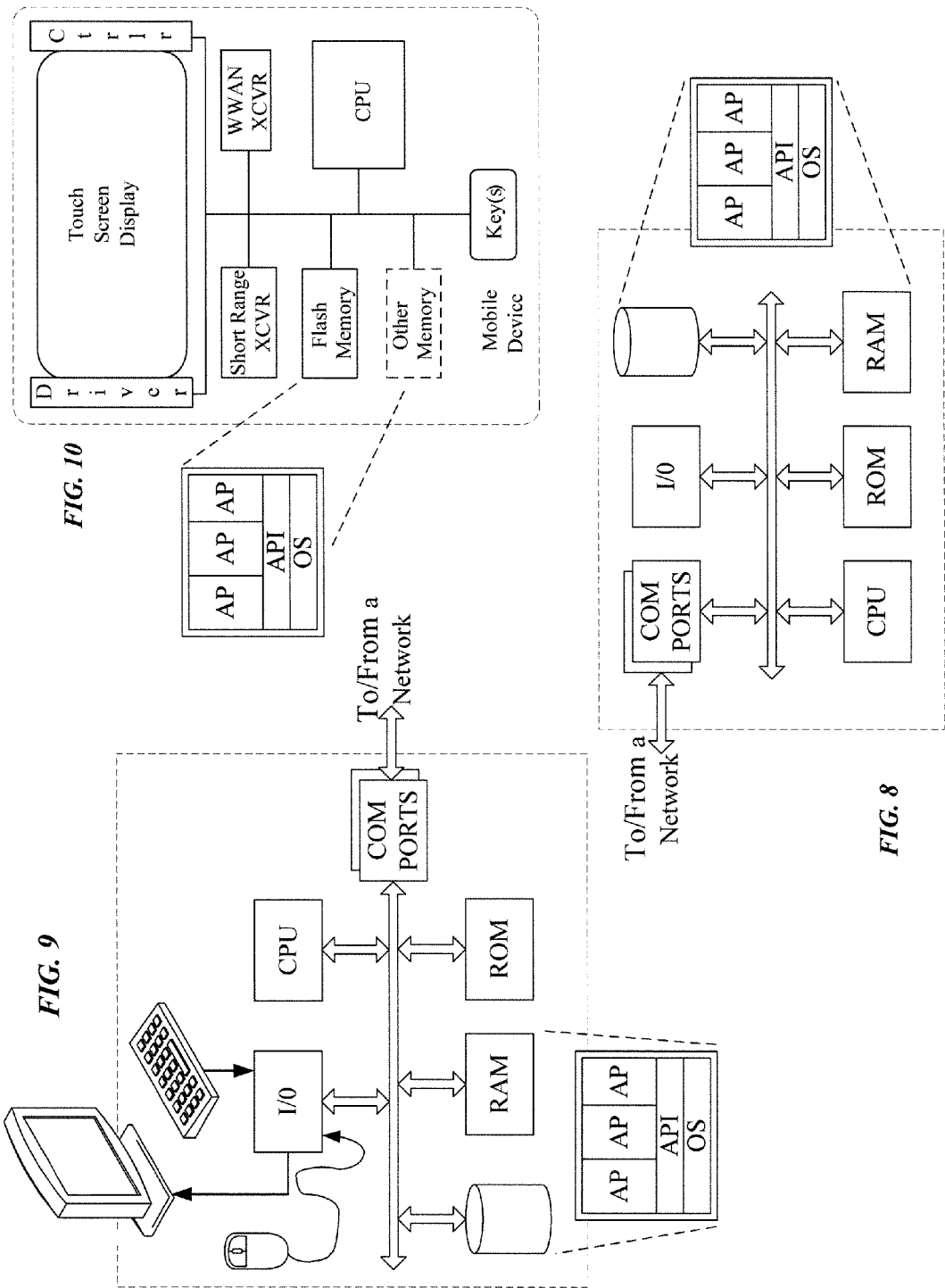

NETWORKED SYSTEM OF INTELLIGENT LIGHTING DEVICES WITH SHARING OF PROCESSING RESOURCES OF THE DEVICES WITH OTHER ENTITIES

RELATED APPLICATIONS

This application is related to U.S. application Ser. No. 13/463,586 Filed May 3, 2012 entitled "NETWORKED ARCHITECTURE FOR SYSTEM OF LIGHTING DEVICES HAVING SENSORS, FOR INTELLIGENT APPLICATIONS," the disclosure of which also is entirely incorporated herein by reference.

This application is related to U.S. application Ser. No. 13/463,594 Filed May 3, 2012 entitled "LIGHTING DEVICES WITH SENSORS FOR DETECTING ONE OR MORE EXTERNAL CONDITIONS AND NETWORKED SYSTEM USING SUCH DEVICES," the disclosure of which also is entirely incorporated herein by reference.

TECHNICAL FIELD

The present subject matter relates to techniques and equipment to a networked system of intelligent lighting devices, for example, that utilizes the network to communicate information as to detected device or ambient conditions and/or information for controlling the devices, where the system also provides a distributed processing function that utilizes processor and/or memory resources if/when available in some or all of the lighting devices of the system.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use. Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often such devices are controlled individually or as relatively small groups at separate locations.

With the advent of modern electronics has come advancement both in the types of light sources and in the control capabilities f the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. Advanced electronics in the control elements have facilitated more sophisticated control algorithms as well as increased networking of lighting devices.

Sensing and network communications have focused on the lighting functions/applications of the lighting devices. For example, sensors may be provided in a lighting device to detect parameters relevant to control operation of the lighting device, and the processor in the device controls the source(s) of the device in response to the sensor inputs. Alternatively or in addition, a communication interface in each of a number of networked lighting devices may allow communication about the status of each lighting device to a system control center. A programmed computer or a person at the control center then may be able to send commands to individual lighting devices or to groups of lighting devices, for example, based on a decision responsive to one or more conditions sensed by some or all of the lighting devices.

However, these advances in lighting devices and networked systems have mainly addressed aspects of the lighting provided by the lighting devices. For example, lighting devices may be adjusted, turned ON and/or turned OFF based on monitored conditions, either by processor logic within the device(s) or commands from a central control. It also has been suggested that networked lighting devices could provide transport for data communications to/from other devices that may come within range of the lighting device and/or its internal communication interface.

The increasingly sophisticated electronics associated with lighting often now include a central processing device as well as memory for program and data storage. Where the lighting devices are networked, each device also includes some form of communication interface, to enable the desired communication with other lighting devices and/or with networked control computers. These elements of the lighting devices involve costs, when purchasing and deploying the lighting devices. Building an installed base of such equipment, with substantial numbers of lighting devices each having sophisticated electronics, incurs a financial investment. In many cases, the electronics are a substantial cost for each lighting device, and that cost may be multiplied by a large number of such devices in an extensive networked implementation owned by or operated for a large enterprise. Despite the infrastructure cost, the resources may be idle for substantial periods of time, e.g. when lighting devices are OFF for extended periods or even during operations when individual devices are not actively communicating or not using full processing or memory resources (for example during intervals between substantial device setting changes, which may require execution of a processing intensive algorithm).

Hence, there is room for improvement in the usage of the resources in lighting devices, e.g. to increase the usage of costly processing and memory resources in networked lighting devices.

SUMMARY

The concepts disclosed herein facilitate improved utilization of resources of networked lighting devices. For example, a lighting system might also offer a distributed processing function that utilizes processor and/or memory resources if/when available in some or all of the lighting devices of the system.

An example of such a system might include the lighting devices, a computer for a lighting system related core function and a resource manager. Each lighting device includes a light source as well as a communication interface, configured to enable communication through a communications network. A processor of the lighting device has access to the communication interface. The lighting device also includes a memory accessible to the processor and one or more programs stored in the memory for execution by the processor. Execution configures the processor to perform a monitoring function and/or a function related to operation of the light source, for example, for a core function of the lighting system, and to communicate regarding the core function(s) via the communication interface. However, execution of the program(s) also configures the processor to make resources of the processor and/or the memory available for a distributed processing function via the communication interface. The computer communicates through the network with the lighting devices so as to receive information from and/or send information to the processors of the lighting devices with regard to the one or more core functions.

The resource manager also communicates through the network with the lighting devices. When the resource manager receives a job for distributed processing, the resource manager identifies lighting devices having resources of the processors and/or the memories available for distributed processing of the received job. The resource manager distributes tasks and/or data of the received job through the communications network to the identified lighting devices, for distributed processing therein. The resource manager also receives, from the identified lighting devices through the communications network, results of distributed processing for the received job utilizing the available resources. The received results are processed to produce a composite result for a response to the received job.

The technologies disclosed in the detailed description also encompass various methodologies and/or system components. With regard to the resource manager, for example, the detailed description encompasses an example of one or more computers configured to implement the resource manager, a method as might be performed by such a computer or computers and an article of manufacture comprising a machine readable storage medium and a program embodied in the medium that configures a computer to perform the resource manager functions.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 illustrates another intelligent lighting device that may be used as one of the lighting devices in the system of FIG. 3.

FIG. 7 is a functional block diagram of a monitoring and communication module used in an example of an intelligent lighting device like that of FIG. 6.

FIG. 8 is a is a simplified functional block diagram of a computer that may be configured as a host or server, for example, to function as the one of the control computers in the system of FIG. 3.

FIG. 9 is a simplified functional block diagram of a personal computer or other user terminal device, which may be used as a control computer or in communication with a server implementation of a control computer, in the system of FIG. 3.

FIG. 10 is a simplified functional block diagram of a mobile device, as an alternate example of a user terminal device, which may be used as a control computer or in communication with a server implementation of a control computer, in the system of FIG. 3.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The concepts discussed in the detailed description that follows, and illustrated in the accompanying drawings herein facilitate improved utilization of resources of networked lighting devices. The examples described here and illustrated in the accompanying drawings enable a lighting system to share processor and/or memory resources for other distributed processing purposes or functions, e.g. when the system resources in some or all of the lighting devices of the system are otherwise available for the ancillary processing function.

Figure 1:
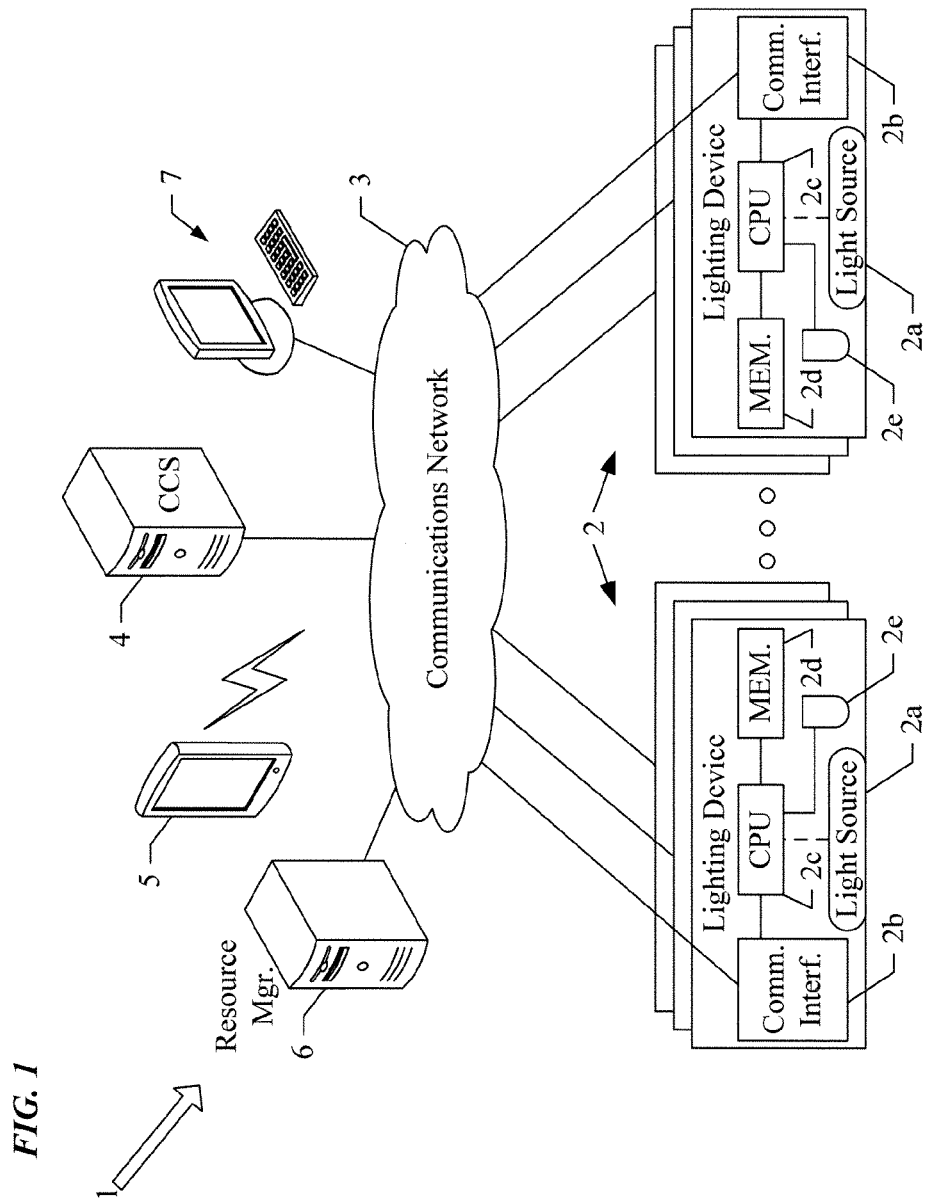
FIG. 1 is a functional block diagram of a somewhat simplified exemplary system of intelligent lighting devices and associated computers, configured to implement resource sharing.

Reference now is made in detail to the examples illustrated in the accompanying drawings and discussed below. FIG. 1 illustrates a high level example of a system 1 of intelligent lighting devices 2 and computers connected or otherwise coupled for communication via a network 3. The system 1 is shown in high level block diagram form.

In this first simplified example, each lighting device 2 has similar elements (indicated by the same reference numerals). Later examples include several more specific configurations of intelligent lighting devices that utilize additional and/or somewhat different elements. Also, the various devices, elements and configurations thereof are exemplary only because other elements and configurations may be used in the same or different implementations of a system like system 1, for different lighting applications, for different monitoring applications, for different related applications like external communications, and the like.

With more particular reference to the example of FIG. 1, each lighting device 2 includes a light source 2a. The light source 2a may be formed by one or more of any type of light emitter device that is suitable to a particular application of the lighting device 2. As will be discussed later with regard to more detailed examples, the light source 2a and other elements of the device 2 may form an integral unit such as a light fixture or light bulb, the other elements of the device 2 may be attached as a separate unit configured to control the light source, or the other elements may form a somewhat separate module mounted in the vicinity of the light source 1

Each lighting device 2 also includes a communication interface 2b, configured to enable communication through the communications network 3. The communication interface 2b may be of any type suitable to provide the desired communication capabilities, e.g. bandwidth or data rate, for communication via the particular implementation of the network 3. The communications to and from the device 2 using the communication interface 2b, for example, can be radio frequency or optical type wireless communication or use optical or electrical hard wire technologies. The network may be partial or entirely private, e.g. a local area network (LAN) or intranet; or the network may be a wide area network such as the public Internet.

Each lighting device 2 also includes a processor, shown as a central processing unit (CPU) 2c in the drawing. Specific examples discussed later utilize a microcontroller or a microprocessor. The CPU 2c of the lighting device 2 has access to the communication interface 2b, to control communications of the device 2 to and from the communications network 3. The lighting device 2 also includes a memory 2d that is accessible to the CPU 2c and one or more programs stored in the memory 2d for execution by the CPU 2c. In a microcontroller example, the memory may be within the microcontroller; whereas a microprocessor implementation will typically utilize memory separate from but accessible by the microprocessor.

The lighting devices 2 in the example implement one or more core functions of the system 1, that is to say functions that are essential to the design of the particular system and/or the main business model of the entity operating the lighting devices 2. The core function of the light source 2a is light emission. The other elements of a lighting device 2 may implement one or more core functions that are related to lighting, for example, monitoring a light related condition and/or controlling operation the light source 2a. Instead of or in addition to the function(s) if any related to lighting, the other elements of a lighting device 2 may implement another core function of the entity such as monitoring of a condition that need not be directly related to operation of the light source 2a. In the example, each lighting device 2 includes a sensor 2e for detecting a condition, although as noted above, the condition may be related to operation of the light source 2a or may be another type of condition external to the lighting device 2 and/or not directly related to the operation of the light source 2a. If sensors are included, the different devices 2 may use different sensors 2e or different combinations of two or more sensors 2e for particular core functions of the device(s) 2.

Execution of one or more programs from the memory 2d configures the processor CPU 2c to perform a monitoring function and/or a function related to operation of the light source, for example, for a core function of the lighting devices 2. Execution of the one or more programs from the memory 2d also configures the processor CPU 2c to communicate regarding the core function(s) performed by the lighting device 2 via the communication interface 2b and the communications network 3.

For the core functions, the system 1 also includes one or more computers operated by the entity that operates the lighting devices 2. A later more detailed example includes a number of higher levels of control system computers. In the simplified example of FIG. 1 of the system 1, a computer 4 serves as a central control system (CCS) server. The exemplary system 1 also includes one or more user terminal or client computers, for personnel of the entity operating the lighting devices 2, represented generally by the tablet computer 5 shown in the drawing. For resource sharing purposes, the entity in this example also operates a resource manager 6. The resource manager 6 receives jobs from and sends final results to other computers, such as other computers of the same entity like the tablet computer 5 as well as from third party computers represented by the desktop type terminal computer 7. The CCS computer 4 and the resource manager computer 6 are shown as using hardware platforms of any type as might be used for implementing network server or host functions. Although only one instance of each computer 4 and 6 is shown, it will be recognized that the functions of these platforms may be implemented in a distributed fashion on multiple computers. Whether a single or distributed implementation, the CCS and resource manager functionality may both run on the same computer(s) or on separate hardware as shown.

The tablet computer 5 and the desktop computer 7 are intended as general examples of the computer processing type devices commonly available for operation by individual users, although in some cases functions attributed to those devices in this discussion can be implemented by other host or server computers. Alternatively, devices having a form factor of a user device can be programmed to operate as servers, for some purposes.

Although not shown in this first drawing, each of the computers 4 to 7 has internal processors, memories and programming; and each of the computers 4 to 7 has a communication interface enabling the respective computer to communicate through the network. The communication interface in each of the computers 4 to 7 may be of any type suitable to provide the desired communication capabilities, e.g. bandwidth or data rate, for communication via the particular implementation of the network 3, in a manner similar to that discussed above relative to the interface 2b.

One or more of the computers 4 to 7 communicate through the network 3 with the lighting devices 2. In some cases, the computers 4 to 7 communicate with each other through the network 3. In our example, the CCS computer 4 communicates through the network 3 with the lighting devices 2, so as to receive information from and/or send information to the processors of the lighting devices with regard to the one or more of the core functions performed by the devices 2. For example, the CCS computer 4 may receive data communications from the intelligent lighting devices 2 regarding the condition(s) sensed by each of the lighting devices 2. The CCS computer 4 may also send commands through the network 3 to control one or more operations of the lighting devices 2. The user terminal 5 may similarly communicate through the network 3 with the intelligent lighting devices 2, or the user terminal 5 may communicate with and interact with functions of the system 1 via the CCS computer 4.

The resource manager 6 in the illustrated example is another computer having and interface and programming to enable the commuter to communicate with other devices or computers through the network 3. In the example, the resource manager 6 is implemented on a hardware platform of a type typically used as a server or host computer. The resource manager 6 is implemented by appropriate programming. Although the programming may run on a separate computer as shown, the resource manager 6 programming may run on any other computer, such one or both of the computers 4 and 5.

Program execution within the lighting devices, to implement core functions like condition monitoring and/or lighting control, was outlined earlier in the discussion of this first example. However, execution of the program(s) from memory 2d also configures the processor CPU 2c in each lighting device 2 to make resources of the processor 2c and/or the memory 2d available for a distributed processing function via the communication interface 2b and the communications network 3. In the example, these later communications include communications with the resource manager 6. For example, the processor may provide information to the resource manager 6 that enables the resource manager 6 to determine availability of resources of the processor 2c and/or the memory 2d in each of the lighting devices. The communications also include instructions to operate or use available resources for a distributed processing function and to return results of such processing.

The resource manager 6 receives a job for distributed processing. The job may be received locally or via network communication. In one example, the resource manager 6 receives the job from another one of the computers via communication through the network 3. The job for distributed processing may come from either of the computers 4 and 6, but for purposes of a later specific example, we will assume that the job is received from a third party computer such as the computer 7. The job will include information indicating the type of processing needed as well any data (or links to data) that is to be processed.

Upon receiving the job, the resource manager 6 identifies resources of the processors (CPUs) 2c and/or the memories 2d that are or are expected to be currently available for the distributed processing function in identified ones of the lighting devices 2 for processing of the received job. The determination may be based on substantially concurrent communications with the lighting devices and/or the CCS computer to determine actual current availabilities; or the resource manager 6 may be capable of predicting processing requirements and associated availability of resources intelligently ahead of time based on information monitored or obtained earlier from the other elements of the system 1. The resource manager 6 distributes tasks and/or data of the received job through the communications network 3 to the identified lighting devices 2, for distributed processing in the identified lighting devices. In this way, the system is poised to accept spontaneous or arbitrary job request inputs and allocating tasks to available resources within the system. In many cases, the actual allocations will not utilize all of the available resources for a particular job.

The resource manager 6 also receives, from the identified lighting devices 2 through the communications network 3, results of the distributed processing for the job that have utilized the identified available resources to which tasks of the job were allocated. The resource manager 6 processes the received results to produce a composite result for a response to the received job. In the current example, the resource manager 6 might send the composite processed final result through the network 3 to the computer that submitted the job, e.g. to the third party computer 7.

Although not shown, the system 1 will typically include an element or a function implemented on one or more of the computers 5, 6 to control access to core functions and to the resource sharing feature(s) of the system 1. Such access control, e.g. to determine authenticity of users and/or their terminals and possibly to determine authorization to utilize requested features or functions of the system, may be implemented in a variety of different ways intended to insure a desired level of security and management control by the enterprise or other entity operating the system. There may also be operational control based on priorities. For example, core functions may have priority over processing jobs utilizing the resource sharing features. As another example of priority handling, a job received from one source or for one identified user may have priority over and therefore be serviced before a job from a different source or for a different user.

Figure 2:
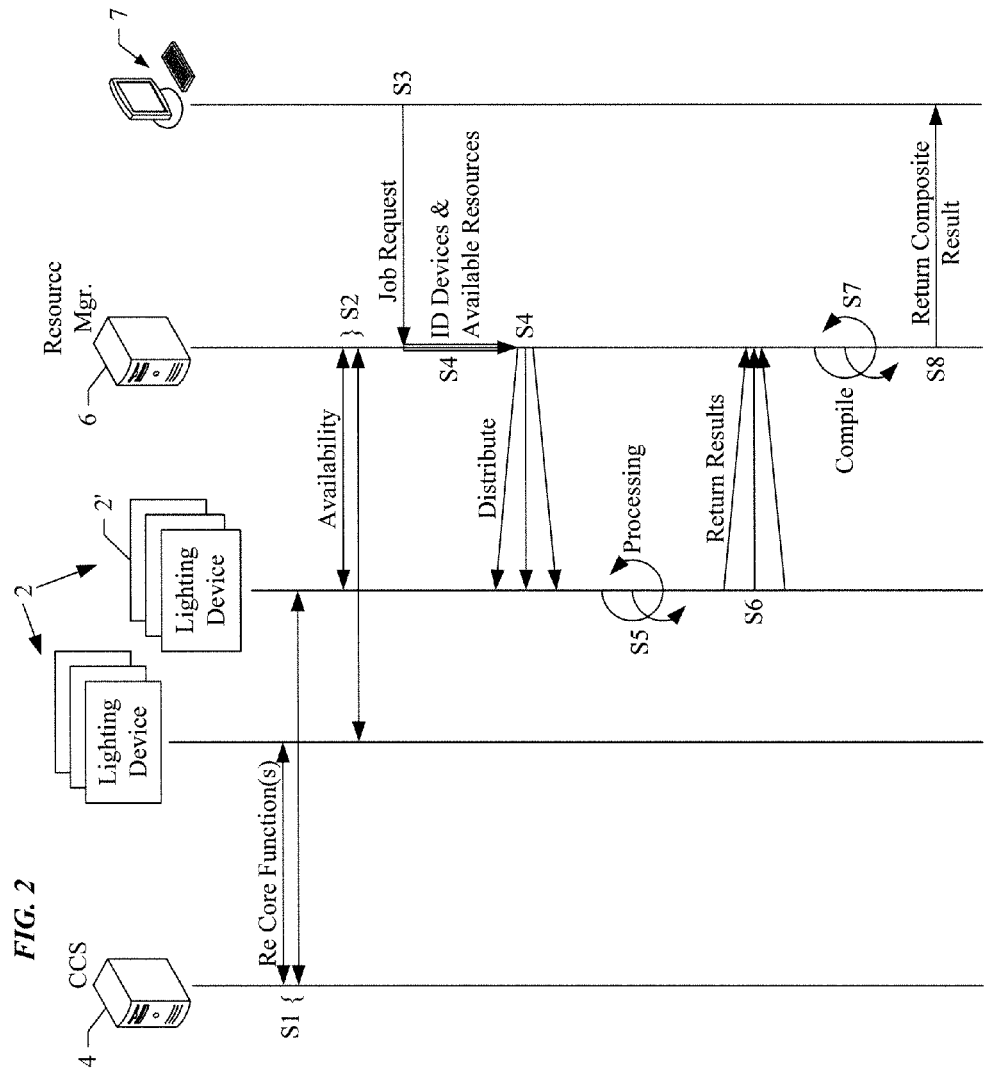
FIG. 2 is a high-level signal flow diagram, which may be useful in under understanding certain procedures, including a resource sharing procedure for distributed processing of a job, in the system of FIG. 1.

FIG. 2 shows an example, in the form of a signal flow diagram, of communications/steps involved in some of the operations of a system 1 like that of FIG. 1. In this example, the CCS computer 4 communicates with the intelligent lighting devices 2 for core functions of the system 1 (step S1 in the drawing). In some cases, the computers 4 to 7 communicate with each other through the network 3. In our example, the CCS computer 4 receives information from and/or sends information to the processors of the lighting devices 2. For example, the CCS computer 4 may receive data communications from the intelligent lighting devices 2 regarding the condition(s) sensed by each of the lighting devices 2. The CCS computer 4 may also send commands through the network 3 to control one or more operations of the lighting devices 2. These communications of the CCS computer 4 will, over time, go to and from all operational lighting devices 2. The communications may be regular or periodic, or the communications may occur when and if needed. During some periods, the communications may involve only a small number of the lighting devices 2; while at other times, the communications may involve a substantial number, most or all of the lighting devices 2.

In the drawing, the communications between the CCS computer 4 and the lighting devices 2 appear as an initial step S1, for convenience. In practice, these communications will typically continue with some or all of the lighting devices 2 even while other steps of the method relating to distributed processing via resource sharing, in relation to a received job, are being performed.

The resource manager 6 receives information, over the network 3, which the resource manager 6 can process to determine resource availability for a received job. The resource manager 6 can obtain this availability information in a variety of ways. In the example, the resource manager 6 communicates back and forth with the intelligent lighting devices 2, as represented by the two-way arrows at step S2 in the drawing. For example, the resource manager 6 may periodically poll the various intelligent lighting devices 2 through the communications network 3; and in response, the resource manager 6 will receive data from the intelligent lighting devices 2 that can be processed to determine the resource availability.

The received data may indicate available processor resources and/or memory resources in each intelligent lighting device 2. However, the system may provide other forms of data to the resource manager 6 that may be translated into or otherwise processed to obtain the availability information. As an example of this later type of approach, the data may indicate various loading factors with respect to each of the intelligent lighting devices 2, from which the resource manager 6 can determine unused capacities and/or predict availability.

In the example discussed so far, the resource manager 6 communicates back and forth directly with the intelligent lighting devices 2. As noted earlier, however, other techniques may be used to collect availability related information. For example, the CCS computer 4 may accumulate load factor information regarding the resources in the intelligent lighting devices 2 during normal communications with the intelligent lighting devices 2. With such an approach, the resource manager 6 communicates with the CCS computer 4 either to obtain load factor information for processing or to obtain resource availability information already determined by the CCS computer 4.

For convenience, the drawing shows a single instance of the step S2 in which the resource manager 6 obtains the resource availability information regarding the intelligent lighting devices 2. If the system will process only a single job for some extended period, a single collection of resource availability information might be sufficient. However, if the system will offer distributed processing via shared resources, for a more substantial number of jobs, particularly if some jobs will be processed at least somewhat in parallel, then the collection of resource availability information will typically continue with some or all of the lighting devices even while other steps of the method relating to distributed processing in relation to a particular received job are being performed.

In step S3, the resource manager 6 receives a job for distributed processing by resources of the intelligent lighting devices 2 that may be available in the system of FIG. 1. Typically, the received job will include a request, for example, specifying the source computer 7 and the type of processing requested. Although not shown for simplicity, there may be a determination of authenticity of the user and/or device sending the job request, level of authorization to utilize particular features or functions of the system and/or a determination of relative priority for the job. The job request will include or be accompanied with information as to the data to be processed. For example, the resource manager 6 may receive one or more files to be processed, or the resource manager 6 may receive one or more links to enable the resource manager 6 or the intelligent lighting devices to retrieve the file(s) to be processed via network communication.

In step S4, the resource manager 6 analyzes the job as well as the information regarding resource current or predicted resource availability to identify resources of the processors and/or the memories available for the distributed processing function in identified ones of the intelligent lighting devices 2 for processing of the received job. For a given job, the analysis may identify some or all of the intelligent lighting devices 2 for distributed processing on the particular job. In our example, we will assume that the analysis by the resource manager 6 identifies intelligent lighting devices 2' having suitable resources available at the time, although others of the intelligent lighting devices 2 are not selected. Depending on circumstances, for example, some devices may not have appropriate or sufficient resources available at the time, or a limited number of intelligent lighting devices 2' may have sufficient resources to handle the particular job in a timely and efficient manner.

In step S4, the resource manager 6 distributes tasks and/or data of the received job through the communications network to the identified lighting devices 2', for distributed processing in the identified lighting devices 2'. For example, the resource manager 6 will send one or more messages to each of the identified lighting devices 2' indicating the processing tasks that the respective device 2' is to perform and either providing the data or a link to the data that the respective device 2' is to process in accordance with its assigned task(s). For example, different devices 2' may be assigned similar processing tasks but to be performed on respectively different sub-components of the overall data. As another example, one or more of the identified lighting devices 2' may be assigned to process a result produced from processing by yet other(s) of the identified lighting devices 2'. Even within any given device 2', the allocation of resources to a particular task for the job may utilize some or all of the available resources of that device 2'.

At step S5 in the illustrated process flow, the identified lighting devices 2' perform the respectively assigned processing tasks on the appropriate data, utilizing the available resources of those devices to which the tasks for the job have been allocated. In each device 2', the processing produces at least one result. In step S6, the processed data resulting from the distributed processing operations of the devices 2' in step S5 are sent back from the identified lighting devices 2' through the communications network to the resource manager 6. If each device 2' is doing a separate piece of the overall distributed processing for the job, the respective device 2' may send its processed data result directly back to the resource manager 6. Alternatively or for other job processing configurations, some of the lighting devices 2' may act as intermediaries to receive and process data from sub-groups of the identified lighting devices 2'. Such an intermediary device would further process results received from its affiliated sub-group and forward the combined results through the network to the resource manager 6.

A step S7, the resource manager 6 processes the results that it received from the identified intelligent lighting devices 2' in step S6, to produce a composite result from the distributed processing for the particular job. In the example, step S7 involves the resource manager 6 compiling an overall composite processing result obtained from the separate results received from the identified intelligent lighting devices 2'. The exact nature of the processing in step S7 will depend on aspects of the particular job, such as the type of data received for the job, the type of processing of the data, the manner of distributing the processing tasks among the devices 2' and the desired overall result format.

The overall composite result is delivered in step S8. Although the final composite result may be sent or distributed to one or more other devices or parties, for ease of illustration, the drawing shows the resource manager 6 sending the composite result back to the third party terminal computer 7 that initially requested distributed processing of the particular job.

The process flow and order of steps shown in and described by reference to FIG. 2 are general and exemplary in nature. Other steps or arrangement of steps may be used. For example, the illustrated process flow collected information to enable the determination or prediction of availability of resources before the job was received and possibly while the job was processed (e.g. for use in later resource availability determinations as later jobs are received). An alternative approach would be to obtain information to enable the resource availability determinations, either from the intelligent lighting devices 2 or from the CCS computer 4 upon receiving each job. This later approach may reduce communications across the network to just those needed to obtain the information as required for each job and/or may allow tailoring of the request for information and the responsive information transmission(s) to each particular job.

FIG. 1 provided a high level illustration of a system 1 for providing lighting and related functions and offering resource sharing for distributed processing in the lighting devices 2. The resource sharing for distributed processing may be implemented in a variety of different implementations of such a system 1 and/or using a wide range of different types of intelligent lighting devices. It may be helpful to consider a more detailed example of an overall system as well as several more detailed examples of different types of the intelligent lighting devices.

Figure 3:
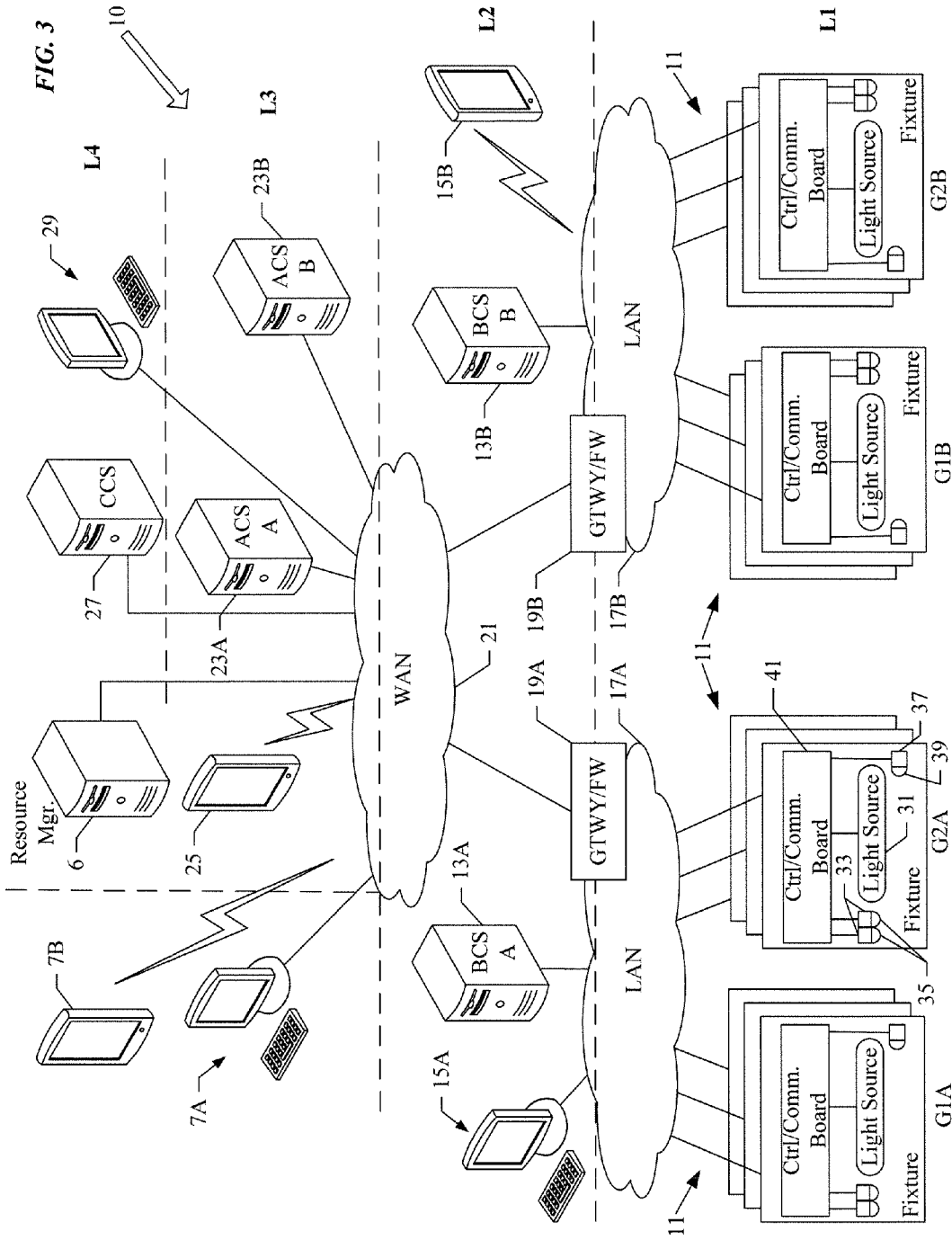
FIG. 3 is a functional block diagram of a more detailed system example, configured to implement resource sharing in addition to core functions of monitoring and/or lighting control.

For that purpose, FIG. 3, for example, shows a system 10 that forms a network of intelligent lighting devices 11, here configured as light fixtures by way of example. The lighting devices 11 still are discussed here at a somewhat higher functional level, however, each of the devices 11 can be implemented using any of several configurations discussed later and shown in drawings such as FIGS. 4-7.

The system 10 is logically organized in a hierarchical manner represented by Layers L1 to L4 (separated by dashed horizontal lines in the drawing). In this example, the lowest layer L1 of the hierarchy is the layer formed by the intelligent lighting devices, in this case, light fixtures 11. The system 10 also includes a hierarchical arrangement of two or more layers of control computers, represented by various types of host/server computers and user terminal computers in the upper three layers L2 to L4 in the example of FIG. 3.

At the lower level L1, a number of light fixtures 11 are organized into each of several groups; and a first layer or local control system computer communicates with some number of respective groups. In the simple system example of FIG. 3, several light fixtures 11 are logically organized as a first group G1A, and another set of light fixtures 11 are logically organized as a first group G2B. These two groups of light fixtures G1A, G2A communicate with a local control server/host type computer 13A and possibly a local user terminal type computer 15A in the L2 layer via a communication network represented by way of example by the local area network 17A. Similarly, several light fixtures 11 are logically organized as a group G1B, and another set of light fixtures 11 are logically organized as another group G2B. These two groups of light fixtures G1B, G2B communicate with a local control server/host type computer 13B and possibly a local user terminal type computer 15B in the L2 layer via a communication network represented by way of example by a second local area network 17B.

The techniques discussed here are applicable to a wide range of lighting applications/systems/configurations. For example, in some sets of groups, the light fixtures may be outdoor lights such as street lamps or parking lot type lighting devices. In a street lamp example, groups of lighting devices might be those for one or some number of city blocks. For purposes of further discussion of the example of FIG. 3, we will assume that the lighting devices 11 are devices within one or more buildings of one or more enterprises. So, for example, the lighting devices 11 in each of groups G1A and G2A could be the devices for lighting a particular floor or floors of a first building; and the lighting devices 11 in each of groups G1B and G2B could be the devices for lighting a particular floor or floors of another building. In such an enterprise building example, the local host/server computer 13A might serve as a building control system (BCS A) for the first building, whereas the host/server computer 13B might serve as a building control system (BCS B) for the second building, although for other types of local organizations of the fixtures the L2 layer computers may be referred to by other designations such a local control systems or local computer systems. The terminals 15A, 15B would communicate via the network 17A or 17B with the respective BCS A 13A or BCS B 13B, although in some instances, the terminals may also communicate through a network directly with the light fixtures in the respective building or the like.

Although public networks could be used, in the building example, the networks 17A, 17B for communications between the intelligent lighting devices 11 and the respective control computers 13A, 15A, 13B, and 15B in each premises are implemented as local area networks (LANs) within respective buildings. Each LAN may be wired (e.g. metallic or optical fiber), wireless (e.g. radio frequency or free space optical) or a combination of such network technologies. For example, one building may use a wired Ethernet network, whereas another may use a wireless network such as a wireless Ethernet (WiFi) network. A wired network may utilize the lines that supply power to the light fixtures and/or the computers, or a wired local network may use separate optical or electrical network wiring. Of course, different buildings or other groups of intelligent fixtures may use different types of LANs. In an outdoor example, e.g. for implementing intelligent fixtures as street lights, the fixtures may utilize power line communication technology, cellular network transceivers, or a wireless mesh communication network topology.

The BCS type computer may be implemented with any suitable computer platform capable of running desired programming for monitoring and control functions and handling the desired work/traffic load expected for the number of intelligent light fixtures with which the particular system 13A or 13B will be working. Each enterprise or building may have one or more of the user terminals 15A, 15B. The user terminal equipment may be implemented with any suitable processing device that can also offer a suitable user interface. The terminal 15A, for example, is shown as a desktop computer with a wired link into the first LAN 17A, and the terminal 15B is shown as a touchscreen type tablet computer with a wireless link into the second LAN 17B. However, other terminal types, such as laptop computers, notebook computers, netbook computers, and smartphones may serve as the user terminal computers of layer L2.

In the exemplary four tier hierarchy, computers 13A, 13B, 15A and 15B are the first layer computers (in exemplary layer L2) in communication with the light fixtures 11 in layer L1. Depending on the number of lighting devices and installations/locations thereof, there may be control computers in one, two or more higher layers. In our building installation example of FIG. 3, there are any number of buildings with installed light fixtures 11 and associated building control system (BCS) computers within a geographic area or region. The BCS (computers and possibly the terminal devices) in layer L2 communicate with a computer or computers in the higher layer(s) via a network. Hence, in the example, each building installation includes a gateway and/or firewall (GTWY/FW) 19A, 19B enabling communications of the various elements/devices connected to the LANs 17A, 17B via a wide area network (WAN) 21. A GTWY/FW provides the requisite communication interfacing and security enforcement for communications between the routers implementing the LAN and routers of the WAN 21. The WAN 21 may be the public Internet, or a private intranet operated by an enterprise or a service provider. As in the lower layer network communications, the links between the LANs and the WAN may use any available/practical wired or wireless technology or any commercially advantageous (cost effective) combination thereof.

The WAN 21 enables the computers in layer L2 to communicate with computers implementing one or more higher layers L3, L4, etc. of the networked architecture of system 10. For example, some number of BCS computer systems within a particular region or area may communicate with a regional or area control system (ACS) computer at the L3 level. In the illustrated example, the computers BCS 13A and BCS B 13B communicate via the WAN 21 with a computer system ACS A 23A. Although the lower layer elements are not shown for convenience, in another area, BCS computers would communicate via the WAN 21 with a computer system ACS B 23B serving as the L3 control computer for the second region or area. As represented generally by the tablet computer 25, layer L3 may also include control computers in the form of various user terminal devices of any of the types discussed earlier relative to devices 15A and 15B in layer L2. Depending on secure authorization policies a user of a terminal such as 25 may interact with either or both of the ACS computers in layer L3, via the WAN 21. Other regions may be served by L2 and L3 host/server computer systems and/or user terminal devices in a similar manner. Each of the computers in layer L3 may be coupled or linked to the network 21 via any suitable wired or wireless technology.

In an example like that shown that encompasses a number of different areas or regions, the area computers (ACSs) 23-25 in layer L3 in turn communicate with one or more computers in a still higher layer L4 of the networked system hierarchy. The communications may utilize a different network, or as illustrated, the computers 23-25 of layer L3 may communicate with the computer(s) of the higher layer L4 via the WAN 21. As the system 10 expands to cover wider geographic areas and to work with larger numbers of lighting devices, the system may be expanded to add further layers to the hierarchy, either in-between the exemplary layers or as still higher layers.

In the four tier example, the L4 layer is the top logical layer. Hence, the example includes a central control system (CCS) computer 27 at that layer. Either in association with or as an alternative to the CCS 27, the L4 layer may include a user terminal 29. Although shown as a desktop terminal 29, the user terminal may be any appropriate type of computer device, as discussed above with respect to terminal devices 15A, 15B and 25 in the L2 and L3 layers. Each of the computers in layer L4 may be coupled or linked to the network 21 via any suitable wired or wireless technology.

For resource sharing purposes, the entity that operates the system 10 also operates a resource manager 6, similar to or the same as the resource manager 6 discussed above relative to FIG. 1. The resource manager 6 receives jobs from other computers, such as other computers of the same entity like the tablet computer 25 as well as from and sends final results to third party computers represented by the desktop type terminal computer 7A and another tablet computer 7B in this example. Although shown at the L4 level for convenience of illustration, the resource manager 6 need not be associated with any particular level of the hierarchy of the system 10.

Although only a single instance of the resource manager 6 is shown for convenience, in a larger scale system like the system 10 of FIG. 1, there will typically be several instances of the resource manager 6. Multiple instances would share the load on the resource manager's functions in a distributed manner. Also, for reliability reasons, multiple instances of the resource manager 6 in this example may be somewhat redundant, so that if one instance is congested or fails or the like, then some or all of the functions of the impacted resource manager can be shifted to one or more of the other instances.

The functions of the resource manager 6 to predict or determine availability of resources, allocate tasks of a job to identified lighting devices 11, receive results from the identified devices 11 and compile overall results are generally the same as those of the manager 6 in the example of FIG. 1. Of note, however, in this example, the resource manager 6 may also communicate with the various BCS and ACS computers, e.g. to obtain information about resource availability in the lighting devices 11. Depending on capacity and load at the various levels, the distributed processing operations may also involve use of resources of at least some of the control computers in the distributed processing, in addition to the resources of the intelligent lighting devices 11. The allocation of resources, distribution of tasks and compilation of results where the resources are in the control computers would be similarly managed via the instance(s) of the resource manager 6 in this example.

Returning to the lower L1 layer in our example, we will next consider the high-level aspects of the intelligent light fixture, with specific reference to elements shown within one of the fixtures in the group G2A.

As shown at a high level in FIG. 3, each lighting device 11 includes a light source 31, a sensor coupling 33 and a sensor 35 for sensing at least one external condition not related directly to operations or communications of the light fixture. The networking and related monitoring and control operations discussed here can be utilized with any desired light source, and different fixtures in the same or different buildings or outdoor locations can utilize different light sources to suit the needs of various lighting applications of the fixtures. Each light fixture 11 may be configured with a single coupling 33 and external condition sensor 35, although the example in FIG. 3 shows two such couplings and sensors in each fixture, e.g. so that each fixture can sense two different external conditions (or the same condition, for example, in different directions or locations around the fixture or to provide a combined reading and thereby improve overall accuracy).

A fixture 11 may include one or more feedback sensors for sensing operational conditions, such as source or circuit temperature, light output intensity, or one or more other characteristics of the light produced by the source, which relate to operation of the fixture. Some or all of the fixtures may have light activation related sensors, such as ON/OFF switches, room occupancy sensors, ambient light sensors for controlling lighting in response to ambient light intensity, and light dimmers. Feedback and light activation sensors are referred to collectively as internal sensors, in that they sense aspects of and/or user inputs to control the internal lighting operations of one or more of the fixtures. In the example, the illustrative fixture in group G2A includes a coupling 37 and at least one internal condition sensor 39.

Each of the light fixtures 11 is configured to sense at least one external condition not related directly to operations or communications of the light fixture. As discussed more later, each fixture also has an interface for communications with other system elements. The condition or conditions detected by sensors 35 are external in that they relate to some aspect observable in the environment around and near the fixture 11 other than those relating to the feedback, normal lighting control and/or communications of the fixture 11. Although more examples will be discussed later, a few examples of conditions that may be detected via external sensing include ambient temperature, humidity, air pressure and wind speed in the surrounding environment; images of nearby objects; motion outside the fixture; gases and other substances in the atmosphere; and temperature and moisture on objects within some distance range of the fixture 11. As such, some of the external conditions, like air temp, air quality, and vibration, relate to ambient conditions around or near the fixture itself; whereas other external conditions, like reflected or directed light, or like an image or a video of a distant object, relate to external remote conditions that exist at some distance from fixture.

A wide variety of sensor devices may be used to sense any one or more of these or other types of external conditions. For example, the sensor may be an optical device, for sensing one or more characteristics of light in the ultraviolet, visible or infrared portions of the electromagnetic spectrum. Optical devices may be used, for example, for sensing direction of light and determining position of an object as described in U.S. Pat. Nos. 6,043,873 and 5,705,804 both by Ramer et al. Other examples of optical sensors include linear and two-dimensional imaging devices.

By way of another example, a lighting device 11 may include a sensor in the form of a Micro-Electro-Mechanical System (MEMS) for sensing motion, similar to gyroscopic devices used in smartphones and the like to sense orientation, movement and direction. Here, MEMS type sensors would sense magnitude and directions of vibrations of the fixtures 11 due to external forces. Collective analysis, for example, might indicate an earthquake and the area and magnitude of the impact.

The external condition sensor coupling 33 is configured to present a sensor connection interface standardized across at least some number of the lighting devices 11. The standardized connection interface is compatible with different types of external condition sensors 35. Each sensor 35 is connected to the standardized connection interface of the sensor coupling 33. In this way, one configuration of the coupling 33 may be used with different types of sensors. Within any one fixture, there may be one, two or more couplings 33 configured to the same standard as well as one, two or more other couplings 33 configured to one or more additional standards.

Each sensor 35 is a device of one of the types compatible with the standardized interface provided through a standardized coupling 33. The location of each sensor 35 enables sensing of a condition external to the respective lighting device 11, although the condition is not directly related to operational performance of the respective lighting device. Each sensor 35 is configured to output a signal responsive to the particular sensed external condition via the standardized connection interface of the associated sensor coupling 33.

Each lighting device, in this case each fixture 11, also includes processing and communications elements, represented collectively in the high-level functional block diagram of FIG. 3 by the control/communication (Ctrl./Comm.) board 41. These elements, for example, include a processor, which is coupled to the sensor coupling(s) 33 in the fixture 11, for processing data responsive to the signal from each included external condition sensor 35. If internal sensing is provided, the processor also is coupled to the sensor coupling(s) 37 in the fixture 11, for processing data responsive to the signal from each included internal condition sensor 39.

The elements on the control/communication board 41 also include a memory, accessible to the processor, which stores programming for execution by the processor and data for processing or that has been processed by the processor during program execution, both for core functions of the system and for resource sharing in distributed processing operations. For example, the memory stores a program corresponding at least in part to each type of included external condition sensor 35. Execution of the program controls at least one function of the processor of the light fixture 11 responsive to the external condition sensed by the sensor 35, such as collection of data regarding sensed external condition(s) and related communications with at least one of the higher layer computers of the system 10. The executable programming also includes one or more programs or modules that facilitate the resource sharing for distributed processing, for example, to interact with the resource manager 6, receive processing task instructions and data to be processed, perform assigned processing tasks and then communicate results back up through the system for compilation at the resource manager 6.

Each light fixture 11 also includes a communication interface accessible by the processor. The communication interface is configured to enable the processor to communicate information resulting from performance of the function of the processor, controlled by the program responsive to the sensed condition through the communications network, in the example, through a LAN 17A or 17B.

In the exemplary four tier hierarchy, computers 13A, 13B, 15A and 15B are first layer computers having communications interfaces enabling each of those computers to communicate through the communications networks 17A, 17B with a different respective group of the fixture type lighting devices 11. In this way, each first layer computer can receive information from the processors of its respective groups of lighting devices. At least one of the first layer computers in communication with each group of lighting devices 11 is configured to process the received information regarding sensed conditions and/or status of the intelligent lighting devices in its associated group to obtain resultant information.

In the exemplary four tier hierarchy, any of the computers 23-25 in layer L3 and/or computers 27-29 in layer L4 would be a second layer computer having a communications interface to communicate through the communications network (WAN 21) to receive the resultant information from first layer computers. The second layer computer is configured to initiate at least one action in response to processing of the resultant information received from the first layer computers.

Although resource sharing may bypass one or more layers of the controlling computers, the control computers may also support the resource sharing for distributed processing. For example, each of the BCS computers 13A, 13B may provide status and load information about the resources of the intelligent lighting devices 11 in the respective group of devices either directly to the resource manager 6 or via higher layer computers such as the ACS computers 23A, 23B and/or the CCS computer 27. Also, as noted earlier, some or all of the control computers may also share their resources during distributed processing.

Each of the various computers in the layers L2 to L4 will run programming to control respective operations thereof including operations for processing condition related data and/or responsive communication and related actions. Although possibly somewhat different in each type of computerized device, each will run an operating system (OS) and one or more applications programs (APs) related to the sensed condition communication and processing functions of the system 10. Depending on the system implementation, some or all of the computers in the layers L2 to L4 may run programming to support aspect of the resource sharing for distributed processing, as outlined herein.

The OS of a particular type of computerized device will provide an application programming interface (API) to allow various application programs to run on the computerized device via the respective OS and in that way utilize the various resources and functions of the computerized device. For example, the API in computerized devices at one or both the higher layers L3 and L4 of computers enables application programming for processing the condition-related data and initiating the responsive action can be written to the standardized API. In this way, it becomes possible for various parties to write application programs for the higher layer programs to respond to different types of conditions sensed by the lighting devices 11 and support different functions desired by the parties that utilize the system 10.

The computer or computers in layer L4 that receive the processed information from the layer L3 computers can initiate one or more responsive actions. The actions may involve any one or more of a variety of reporting functions, such as sending alerts to terminal devices of users who may need to know or respond, generating periodic reports, or the like. The action or actions also may involve generating lighting related commands to send back down through the system 10 to cause one or more of the intelligent lighting devices 11 to modify their operations and/or to sending commands through the system 10 to cause one or more of the intelligent lighting devices 11 to collect and send additional condition related information.

As outlined above, the external condition monitoring, collection of data obtained and processing of external condition data, from lighting devices 11 over a region or area of significant size admits of a wide range of possible applications for the data. The actions that may be initiated from the high level computer may be as wide ranging as the array of possible applications of the monitoring and data processing capabilities of the system 10. For example, the high level computer(s) may generate maps or other forms of reports relating to conditions existing across the monitored region(s). Where the sensed conditions include atmospheric conditions, such as pollution, a map might show the spread of a particular sensed pollutant allowing government personnel to identify the source, track the spread and/or initiate remedial actions. Weather related data collected at a multitude of street and highway lamps would provide much more granular information about weather conditions that is typically available from remote weather monitoring stations today. The maps or other reports generated at the higher level(s) of the system 19 or portions or such information may be distributed through the network to terminal devices of users throughout the effected area, including devices shown in the lower layers of the system 10. As another map example, if sensing of position of objects near lighting devices or sensing vibration of the lighting devices is processed to determine the occurrence and magnitude of an earthquake, a map might illustrate the relative magnitude of the quake throughout an area impacted by the quake.

To facilitate the data processing for the core functions of the system 10, at least the computer(s) at layer L4 have access to information about the positions of the lighting devices 11 to facilitate the relevant processing and related actions. Typically, the position information is known in advance and maintained in a database. Maps of the area(s) or region(s) can be correlated with some or all of the position information. An alternative to the position database would be to include a position detection device, such as a global satellite positioning (GPS) receiver and associated position calculation programming in the lighting devices. This later approach would allow for reporting of position changes, e.g. in response to movement of the fixture if not permanently mounted and/or if taken down and moved for some reason.

As another example of responsive action, the action initiated in the high level computer may relate to further control of lighting operations of one or more of the lighting devices 11. For example, in a situation where the sensed conditions indicate an emergency in a building, the control action may involve sending commands back down through the system 10 to selected lighting devices 11 so as to initiate operations of any number of lighting devices in the effected building, e.g. to help people to evacuate the building and/or to help responders to find the source of the emergency condition.

As noted earlier, another type of action initiated by the high level computer may involve generating commands to send back down through the system 10 to cause one or more of the intelligent lighting devices 11 to collect and send and additional condition related information. To help with damage assessment in the earthquake detection example, these commands might cause lighting devices having image sensors to capture and send back images or videos for assessment.

The elements of the system 10 may be owned and operated by one entity, such an enterprise with multiple buildings distributed over a number of dispersed geographic regions. In a street light example, a counsel of governments for a city and surrounding suburbs may jointly operate the light fixtures and computers to provide unified monitoring and response to one or more conditions in the regions served by the government entities in the council.

However, some of the elements may be operated by different entities. In a building example for diverse building owners, the monitoring service may be provided by an entity operating as a service bureau or provider. In this later case, each building owner would own and operate the light fixtures and LAN in the respective building. The BCS computers and any terminals in layer L1 may be on the premises or remote, and that equipment may be owner by the building owner or the service provider. However, such L1 computers will be configured, at least for the monitoring service, by the entity that provides the monitoring service. The computer(s) at the higher levels would likely be owned and operated by the monitoring service provider, although some may be owned and operated by other entities with whom the service provider has a cooperative agreement, e.g. to a company or government entity that may agree to respond to conditions sensed on premises monitored by the equipment of the service provider.

The discussion here relates to monitoring of one or more conditions external to the lighting devices over a number of premises and/or over a wide geographic area. The intelligence of the devices and the associated feedback sensing, however, allows for a wide range of control functions related to the lighting application as well. For example, the same communication and computer resources can be used to monitor and control the lighting operations of the intelligent lighting devices. For example, the fixtures may report conditions of the sources and fixture electronics to the control system computers and respond to commands from the control system computers to automatically adjust lighting operations. Condition reports generated by a high level computer can be used to advise appropriate personnel to service particular lighting devices, e.g. to replace light source elements and/or other device components when services is appropriate.

In several examples, the intelligence and sensors are integrated with or attached to the fixture or other element that incorporates the light source. However, for some installations, there may be some separation between the fixture or other element that incorporates the light source and the electronic components that provide the intelligence and communication capabilities. Also, in the examples, the sensors are incorporated in the fixture or module that houses the electronic components that provide the intelligence and communication capabilities. However, depending on the condition(s) to be sensed and/or the particular installation, the sensors and standardized couplings may be mounted somewhat separately and connected or otherwise coupled to the electronic components that provide the intelligence and communication capabilities.

The monitoring and communications elements may be applied to or combined with any type of light source. Hence, the intelligent lighting devices may be any desirable type of indoor or outdoor lighting device, signal lighting devices such as traffic lights, lighted signage, etc. A system like that of FIG. 3 may include within the one system any number of these different types lighting devices. A system operated by a city or municipality, for example, might add intelligence to street lights of various types, traffic lights and various types of indoor building lights in buildings used by the government. A system operated by a state or country might add intelligence to lights of the types mentioned with regard to the city, in each city or town of the state or country as well as to highway lights and sign lighting along roads, streets and highways between cities and towns in the jurisdiction. The broader the coverage, the more varied the types of lighting devices that are likely to be included in the system.

A system run by a private enterprise, either to monitor its own premises or to provide monitoring and the like as services to its customers might install intelligent lighting devices or add intelligent modules to existing lighting devices, for indoor and outdoor lighting applications as various types of lighting devices on private property. If such an enterprise sells the services to a government, then the enterprise would install and operate a system like that described earlier for a city, state or country. One service provider enterprise might also sell the services both to government and to private parties, essentially resulting in an overall system that includes both government and private installations of the intelligent lighting devices and could combine data from all of the intelligent lighting devices.

The processing and memory resources in the intelligent lighting devices 11 represent a substantial part of the investment in purchasing and installing the system 10. However, at times some or all of those resources may be under utilized or idle. The resource manager 6 and programming of the lighting devices 11 and possibly one or more of the control computers allow sharing of under utilized or idle resources of the system 10 for distributed processing of data processing jobs that need not be directly related to the core lighting and monitoring functions of the system 10. The entity that operates the system 10 may use the distributed processing service to enhance its own business, or the entity may offer the distributed processing service to other parties to generate additional revenue from operation of the system 10. Although representing a larger scale deployment, the resource sharing for distributed processing may be implemented in the system 10 in a manner the same as or similar to any manner discussed above relative to FIGS. 1 and 2.

Figure 4:
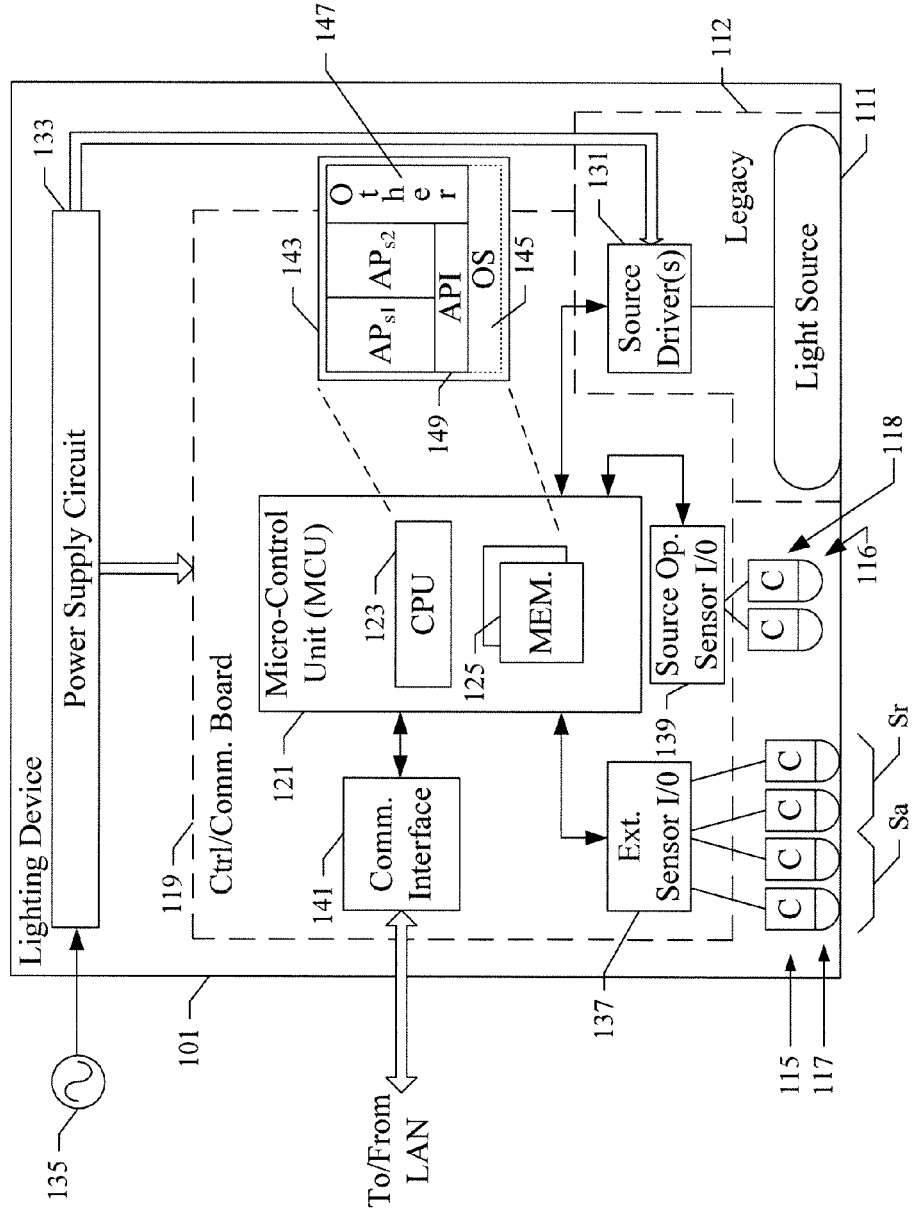
FIG. 4 is a functional block diagram of the elements in a first example of an intelligent lighting device that may be used as one of the lighting devices in the system of FIG. 3.
Figure 5:
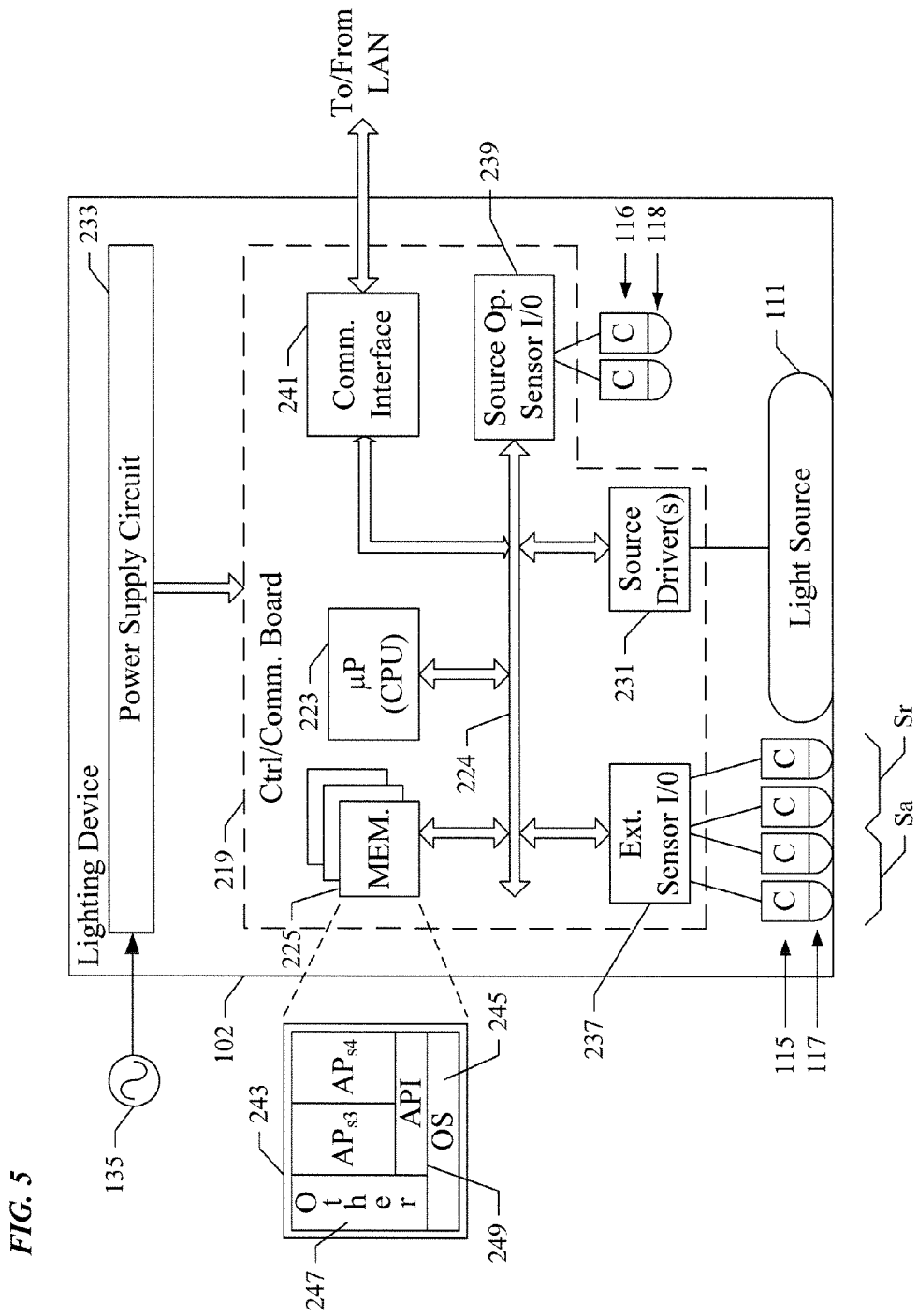
FIG. 5 is a functional block diagram of the elements in a second example of an intelligent lighting device that may be used as one of the lighting devices in the system of FIG. 3.

FIG. 4 shows a first example 101 of an intelligent lighting device based on use of a microcontroller as the device control element, whereas FIG. 5 shows a second example 102 of an intelligent lighting device based on use of a microprocessor (μP) as the device control element. Also, the first example utilizes a legacy light source, whereas the second example utilizes an incorporated source, e.g. as might be used in a new design or installation. Similar elements in these two examples are identified by like reference numerals.

Considering first the example of FIG. 4, the lighting device 101 includes a light source 111 implemented as part of a legacy installation 112. For example, the legacy installation 112 may be an existing type of street lamp or light fixture utilizing an older more conventional type of source. In such a case, some or all of the other elements of the lighting device 101 may be configured as a module coupled to the light source 111 in the legacy installation 112, e.g. as added to a light fixture previously configured to support the light source 111. In the example, the control elements control the light source 111. The light source 111 in the legacy installation 112 could be separately controlled (e.g. by a legacy control system or element, such as a switch). In this later situation, the added elements of the device 101 would mainly provide monitoring and communication functions from the location of the lighting device 101.

The exemplary lighting device 101 includes one or more sensor couplings and one or more sensors as well as communication and control electronics. For the legacy installation 112 of the source 111, the other elements of the lighting device 101 are configured as a module coupled to the light source 111, e.g. as may be added to a light fixture previously configured to support the light source and coupled to the source 111 via existing control and/or power connections of the source.

In the example of device 102 in FIG. 5, the light source 111 is integrated into the fixture or the like, in a unified configuration together with the one or more sensor couplings, one or more sensors and the communication and control electronics. Although the source 111 in the device 102 may be any suitable type of light source, many such devices will utilize the most modern and efficient sources available, such as solid state light sources, e.g. LED type light sources.

In these examples, each intelligent lighting device 101 or 102 is configured to sense at least one external condition not related directly to operations or communications of the lighting device. As discussed more later, each device also has an interface for communications with other system elements. Hence, a lighting device 101 or 102 may have as few as one coupling 115 and one associated external condition sensor 117. In the examples discussed herein, each lighting device 101 or 102 includes a number of sensor couplings 115 and associated sensors 117.

The condition or conditions detected by sensors 117 are external in that they relate to some aspect observable in the environment around and near the lighting device 101 or 102 other than those relating to the feedback, normal lighting control and/or communications of the device 101 or 102. Although more examples will be discussed later, a few examples of conditions that may be detected via external sensing include ambient temperature, humidity, air pressure and wind speed in the surrounding environment; images of nearby objects; motion outside the fixture; gases and other substances in the atmosphere; and temperature and moisture on objects within some distance range of the fixture 11. As such, some of the external conditions, like air temp, air quality, and vibration, relate to ambient conditions around or near the fixture itself; whereas other external conditions, like reflected or directed light, or like an image or a video of a distant object, relate to external remote conditions that exist at some distance from fixture.

The examples thus include one or more sensors Sa of types for sensing or detecting an ambient external condition and one or more sensors Sr of types for sensing or detecting a remote external condition. Examples of external ambient condition sensors Sa include a fire detector, a smoke detector, an airborne chemical detector, an airborne biological agent detector, a carbon monoxide sensor, an air temperature sensor, an air pressure detector, a humidity sensor, a moisture detector, an air speed detector, and a micro-electro-mechanical system type sensor. By way of another example, a lighting device 11 may include an ambient sensor Sa in the form of a Micro-Electro-Mechanical System (MEMS) for sensing motion, similar to gyroscopic devices used in smartphones and the like to sense orientation, movement and direction. Here, MEMS type sensors would sense magnitude and directions of vibrations of the fixtures 11 due to external forces. Collective analysis of vibration measurements, for example, might indicate an earthquake and the area and magnitude of the impact. Examples of external remote condition sensors Sr include a directional light sensor, a video or still image sensor, and a sound detector. Some of the ambient and remote sensors may be optical devices, each for sensing one or more characteristics of light in the ultraviolet, visible or infrared portions of the electromagnetic spectrum. Optical remote condition sensor devices may be used, for example, for sensing direction of light and determining position of an object as described in U.S. Pat. Nos. 6,043,873 and 5,705,804 both by Ramer et al. Other examples of remote condition optical sensors include linear and two-dimensional imaging devices.

In these examples (FIGS. 4 and 5), each external condition sensor coupling 115 is configured to present a standardized sensor connection interface that is compatible with different types of sensors. In that way, one standardized configuration of the coupling 115 may be used with different types of sensors. Within any one fixture, there may be one, two or more couplings 115 configured to the same standard as well as one, two or more other couplings 115 configured to one or more additional standards. Any sensor connection interface supported through a coupling 117 is standardized across at least a number of different lighting devices 101 or 102 in that the different devices have similar couplings that support the same connection and associated electrical aspects of the coupling standard. However, the standardized connection interface in the various lighting devices also is compatible with a plurality of different types of sensors. Each sensor 117 connects to the standardized connection interface of one of the sensor couplings 115. Each sensor 117 is a device of one of the types compatible with the standardized interface provided through a standardized coupling 115.

Although the couplings 115 may support two or more standards for the sensors, as noted, for purposes of further discussion of the examples of FIGS. 4 and 5, all of the couplings 115 in one device 101 or 102 provide the same standardized interface for various types of sensors 117. In either of the multi-sensor examples, Sr sensors may sense the same remote condition or different remote conditions. Similarly, the Sa sensors may sense the same or different ambient conditions. Hence, there is at least one first type sensor located so as to sense a first one of a number of conditions external to the lighting device not directly related to operation of the lighting device and at least one second sensor of a second one of the types different from the first type that is located so as to sense a second one of the conditions external to the lighting device not directly related to operation of the lighting device. Each Sa sensor connects to the standardized interface of one of the couplings 115, and each Sr sensor connects to the standardized interface of another one of the couplings 115. Each of the sensors Sa and Sr is configured to output a signal responsive to the respective sensed condition via the standardized connection interface of the respective sensor coupling 115.

Intelligent lighting devices of the type discussed herein may have only the one or more external condition sensors 117. However, the specific examples 101 and 102 illustrated in FIGS. 4 and 5 also include one or more couplings 116 and sensors 118 to detect a condition related to operation of the lighting device. A device 101 or 102 may include one or more feedback sensors for sensing operational conditions, such as source or circuit temperature, light output intensity, or one or more other characteristics of the light produced by the source, which relate to operation of the lighting device. Such sensors may provide a local or internal feedback loop at the lighting device 101 or 102 or may enable communication regarding the additional condition to another device over a network and associated light source control based on receiving responsive commands from the other device. Some or all of the lighting devices may have light activation related sensors, such as ON/OFF switches, room occupancy sensors, ambient light sensors for controlling lighting in response to ambient light intensity, and light dimmers. Feedback and light activation sensors are referred to collectively as internal sensors, in that they sense aspects of and/or user inputs to control the internal lighting operations of one or more of the lighting devices. Examples of sensors 118 to detect a condition related to operation of the lighting device 101 or 102 include a sensor for detecting temperature of one or more components of the lighting device, a feedback light sensor for detecting intensity or other characteristic of light produced by the lighting device, an occupancy sensor for detecting a condition indicative of occupancy of a region to be illuminated by the lighting device and an ambient light sensor for detecting ambient light near the lighting device. In the examples of FIGS. 4 and 5, the illustrative devices 101 and 102 each include one or more couplings 116 and one or more internal condition sensors 118.

The couplings 116 may be standardized in a manner similar to the couplings 115, or the couplings 116 may be uniquely configured for each respective type of sensor 118. In the example, we will assume that the couplings 116 present a standardized sensor connection interface that is compatible with different types of internal condition sensors. The standard may be the same as or different from the standardized interface(s) of couplings 115. Each sensor 118 in turn is configured to connect to and provide condition responsive signaling via the standardized interface of the coupling 116. As discussed more later, this third category of sensor provides signal(s) used to enable control of operation of the light source at least in part based on the condition(s) sensed by the sensor(s) 118.

A "sensor" may be as simple as a condition responsive transducer for generating an electrical signal bearing a known relationship to the amount or degree or the like of a particular condition that the transducer detects. However, most implementations, particularly those in the examples, utilize sensors that include at least some circuitry for processing the output of the transducer(s) included as part of the sensor. The circuitry receives the signal from the transducer(s) in the sensor and produces an output via the coupling that conforms to the signaling aspects of the sensor coupling standard, e.g. as a standard analog level signal on one or more pins designated for an analog connection and/or as appropriately formatted data on the pins designated for data outputs. The electronics of such a sensor may also receive and respond to a signal received from the I/O interface on the board.

Each exemplary lighting device 101 or 102 also includes a processor coupled to the sensor couplings 115 for processing data responsive to the signals from the sensors 117. However, the two examples utilize different processor implementations.

Consider first the example of FIG. 4. There, the lighting device 101 also includes processing and communications elements, in this case implemented on a control/communication (Ctrl./Comm.) board 119. The lighting device 101 includes a Micro-Control Unit (MCU) 121, which implements the control logic for the device 101, that is to say, controls operations of the device 101. The MCU 121 may be a microchip device that incorporates a processor serving as the programmable central processing unit (CPU) 123 of the MCU and thus of the lighting device 101 as well as one or more memories 125 accessible to the CPU 123. The memory or memories 125 store executable programming for the CPU 123 as well as data for processing by or resulting from processing of the CPU 123. The MCU 121 may be thought of as a small computer or computer like device formed on a single chip. Such devices are often used as the configurable control elements embedded in special purpose devices rather than in a computer or other general purpose device. A variety of PIC16 and PIC32 type MCU chips, for example, may be used as the MCU 121 in the lighting device 101.

As noted, the lighting device 101 includes a source 111, which in the example of FIG. 4 is part of a legacy type installation 112. Power is supplied to the source 111 by an appropriate driver 131. The source driver 131 may be a simple switch controlled by the MCU, for example, if the source 111 is an incandescent bulb or the like that can be driven directly from the AC current. Although the driver 131 could be an element on the control/communication (Ctrl./Comm.) board 119, in the example, the source driver 131 is a part of the legacy installation 112 of the source 111, for example, the ballast in an otherwise conventional fluorescent light fixture.

Power for the lighting device 101 is provided by a power supply circuit 133 which supplies appropriate voltage(s)/current(s) to the control/communication (Ctrl./Comm.) board 119 and provides appropriate power to the source driver 131 to power the light source 111. Although shown separately for convenience, the components of the power supply circuit 133 may be mounted on the same board 119 as the control and communication components, depending on considerations such as board/housing space, heat generation, etc. In the example, the power supply circuit 133 receives electricity from alternating current (AC) mains 135, although the lighting device may be driven by a battery or other power source for a particular application. Although not shown, the device 101 may have or connect to a back-up battery or other back-up power source to supply power for some period of time in the event of an interruption of power from the AC mains 135.

The source driver circuit 131 receives a control signal as an input from the MCU 121, to at least turn the source 111 ON/OFF. Depending on the particular type of source 111 and associated driver 131, the MCU input may control other characteristics of the source operation, such as dimming of the light output, pulsing of the light output to/from different intensity levels, color characteristics of the light output, etc. If the source and/or driver circuit have the capability, the driver circuit 131 may also provide some information back as to the operation of the light source 111, e.g. to advise the MCU 121 of the actual current operating state of the source 111.

As outlined earlier, the lighting device 101 includes external condition sensors 117 connected to standardized couplings 115 as wells as sensors 116 for sensing conditions related to operations of the source 112 and associated sensor couplings 118. The couplings 115, 118 provide physical connections, electrical signal connections and any power connections that may be necessary to the respective sensors 117, 116. Physical and electrical connection aspects of each coupling 115, 118 will conform to relevant aspects of the applicable sensor coupling standard. The electrical power and electrical signal communication from and/or to the sensors, in accordance with the electrical aspects of the applicable sensor coupling standard, are provided by appropriate input/output (I/O) circuitry connected between the coupling and the MCU 121. On the MCU side, the I/O circuitry provides a signaling link to a port of the MCU 121 and conforms to the signaling standard for that port. Depending on the design implementation for a particular lighting device 101, I/O circuitry may include a separate circuit for each coupling, two or more I/O circuits for groups of two or more couplings or one I/O circuit for all of the included sensor couplings. In the example of FIG. 4, the I/O circuitry for the sensor couplings 115 is represented by the external sensor input/output (I/O) interface 137; and the I/O circuitry for the sensor couplings 118 is represented by the source operations sensor input/output (I/O) interface 139.

Hence, together, the coupling 115 and the external sensor I/O interface circuitry 137 provide physical and electrical connections as well as electrical power and signal communications for an external condition sensor 117 that conform to the applicable sensor connection interface standard. The signal communications aspects of the standard at least allow the sensor 117 to provide external condition responsive information to the MCU 121. Although the actual sensing element of a sensor may be analog, the information passed to the MCU 121 will typically be in a standardized digital format. The digital format, however, may vary somewhat as between sensor types, based on associated application programming discussed more, later. Preferably, the MCU port connection, the I/O interface circuitry 137 and the interface standard through the coupling 115 also will allow the MCU to control one or more aspects of operation of the sensor 117, e.g. to activate a sensor to sense the applicable condition at a time set by the MCU 121, or to select one of several conditions to be sensed by a multi-condition type of sensor 117, or to adjust a sensitivity of the sensor 117, etc.

As noted, in the examples, the couplings 118 also support a standardized interface that may be the same as or similar to the interface of the couplings 115. Hence, together, the coupling 118 and source operation-related sensor I/O interface circuitry 139 provide physical and electrical connections as well as electrical power and signal communications for a source operation-related sensor 116 that conform to the applicable sensor connection interface standard. The signal communications aspects of the standard at least allow the sensor 116 to provide source operation-related condition responsive information to the MCU 121. Although the actual sensing element of a sensor may be analog, the information passed to the MCU 121 will typically be in a standardized digital format. The digital format, however, may vary somewhat as between sensor types, based on associated programming. The MCU port connection, the I/O interface circuitry 139 and the interface standard through the coupling 118 may allow the MCU to control one or more aspects of operation of the sensor 116, e.g. to activate a sensor to sense the applicable condition at a time set by the MCU 121, or to select one of several conditions to be sensed by a multi-condition type of sensor 116, or to adjust a sensitivity of the sensor 116, etc.

The lighting device 101 also includes a communication interface 141 coupled to a communication port of the MCU 121. The interface 141 provides a communication link to a telecommunications network that enables the MCU 121 to send and receive digital data communications through the particular network. The network may be wired (e.g. metallic or optical fiber), wireless (e.g. radio frequency or free space optical) or a combination of such network technologies; and the interface 141 in a particular installation of the device 101 will correspond to the most advantageous network available (based on considerations such as cost and bandwidth) at the location of the installation. In network examples discussed later, the network is a local area network (LAN), therefore the communication interface is of a type for linking to and communication through the available LAN. The communication interface 141 is therefore accessible by the processor/CPU 123 of the MCU 125, and the communication interface 141 is configured to enable the processor to communicate information resulting from one or more functions that the processor performs in response to the various conditions sensed by the sensors 116 and/or 117 through the LAN or other communications network.

As noted, the MCU 121 includes one or more memories 125. The memories 125 store programming for execution by the CPU 123 as well as data to be processed or that has been processed by the CPU 123. The programming is shown in block diagram or module form as a program stack at 143.

The programming 143 includes various application programs and the like, which are resident in the memory and execute on the CPU. The memory may be within the CPU 123 or may be external memory as shown at 125 in our example. The executable programming may also include an operating system 145.

Of note for purposes of this discussion, the application software includes the software for implementing the control of the lighting device as well as the software for MCU interaction with the various connected sensors. For discussion purposes, the example shows two application programs $AP_{s1}$, $AP_{s2}$, for controlling lighting device operations with respect to two different types of sensors. One type of sensor may be for one or more of the source operation-related condition sensors 116, but in this example, we will assume that the sensor application program $AP_{s1}$ controls operations in relation to a type of one of the ambient external condition sensors Sa, and the sensor application program $AP_{s2}$ controls operations in relation to a type of one of the remote external condition sensors Sr. Application programs, such as $AP_{s1}$, $AP_{s2}$, are examples of programming for execution by the processor that corresponds at least in part to the type(s) of sensors and controls at least one function of the processor responsive to the condition(s) sensed by the sensor(s). The CPU 123 also will run one or more other application programs 147 from memory 125, to control various other functions of the lighting device 101, such as control of the light source 111, interaction with other types of sensors 116 or 117, and communications through the interface 141.

The programming 143 implements a standard application programming interface (API) 149 for at least the application (s) relating to external condition sensing. Although not separately shown, the programming 143 may implement the same or different APIs for applications related to the source operation-related condition sensors 116 and/or other applications to be executed by the CPU 123. An API, such as 149, provides a standard software interface for exchanges between software components, allowing components to communicate and interact. An API standard, for example, can specify command formats, response formats, data structures, etc. In this case, the standard sensor API 149 offered or supported by the programming 143 allows various parties, such as different sensor manufactures, to write application programs AP for the MCU 121 to allow the device 101 to utilize different external condition sensors 117.

The API 149 for example may run on the CPU 123 directly, and if provided, the OS 145 would be on the CPU 123 as well. Other programming 147 may be in the CPU, or it may be in external memory 125. The application programs APs1, APs2 would be found in memory 125.

The application programs AP and the API 145 also enable the MCU 121 to communicate information or data generated in response to processing of signals or outputs of the sensors 117 so as to implement a standardized application programming interface with respect to the sensor related processing function(s). The information resulting from processing functions of the MCU in turn is communicated through the interface 141 and the network in a manner conforming to the standardized application programming interface. In this way, various devices 101 communicate data relating to various types of sensors through the network in a standardized format that can be readily processed by other equipment that is aware of the format supported by the application programming interface.

Hence, each application program $AP_{s1}$ or $AP_{s2}$ controls one or more functions of the processor (CPU) 123 responsive to the external condition or conditions sensed by the respective type of sensors 117. For example, the programming may control how data regarding the sensed conditions is collected, processed and formatted for communication, e.g. so as to conform to relevant aspects of the standard interface specification and associated API. The programming 143 may also configure the processor/CPU 123 to control the light source 111, either based on internal logic or based on commands received at the device 101 via the network communication. Each application program $AP_{s1}$ or $AP_{s2}$ may control operation in relation to a single one of the sensors 117 or in relation to some number of two or more of the sensors 117 and/or 118.

The application program corresponding to a particular type of sensor enables the processor 123 to receive data representing the condition sensed by the sensor 117 and controls at least one function of the CPU 123 responsive to the condition sensed by the sensor, such as processing of the data for communication via the interface 141 and the network. The control function(s) implemented by execution of the application program for a particular type of sensor may involve other logic in addition or instead of processing for communications. For example, the application program may determine timing for detecting a particular condition or for activating or responding to a particular sensor, e.g. on a periodic basis so as to reduce processing load and/or communication traffic. As another example, the control function relating to a particular condition may involve a threshold, either of a value or a change regarding the sensed condition. A program might cause the MCU 121 to react to detection of more than some set amount of a chemical in the atmosphere as an indication of a harmful condition or to update a reported temperature when the temperature has changed more than a threshold amount. The open nature of the lighting devices 101, provided by the sensor interface and associated API supports use of a wide range of sensor types and an even wider range of program logic for different networked applications of such devices.

Either as part of the OS 145 (if provided) or part of the other programming 147, the executable programming 143 for intelligent lighting device 101 includes programming that supports the resource sharing and distributed processing functions of the system 10. Such programming, for example, configures the processor CPU 123 in the intelligent lighting device 101 to make resources of the processor 123 and/or the memory 125 available for a distributed processing function via the communication interface 141 and the particular communications network. Such programming enables communications with other system elements to enable the resource manager 6 to determine or predict resource availability and allocate one or more tasks to available resources within the intelligent lighting device 101. The programming also enables the device 101 to receive instructions and data to be processed via the communication interface 141, perform the allocated processing task(s) and return processed data back up through the system for compilation at the resource manager 6.

Consider next the alternative example of a lighting device 102 shown in FIG. 5. The alternative example of a lighting device 102 includes a somewhat similar source 111. As noted earlier, the source is a new source integrated in a new installation type implementation of the device 102. Although the driver 231 for the source 111 could be separate, in the example, the source driver circuitry 231 may be implemented as part of the control and communication board 219 as shown. As discussed earlier, the lighting device 102 also includes the sensors 116, 117 and couplings 115, 116 as in the device 101 of FIG. 4. Many of the functions/operations of the device 102 are similar to those of device 101, however, the lighting device 102 utilizes a somewhat different control architecture than the MCU based arrangement of the device 101 shown in FIG. 4.

Hence, in the lighting device 102 of FIG. 5, the processing and communications elements on the control/communication (Ctrl./Comm.) board 219 include a microprocessor (μP) 223, which serves as the programmable central processing unit (CPU) of the lighting device 102. The μP 223, for example, may be a type of device similar to microprocessors used in servers, in personal computers or in tablet computers or other general purpose computerized devices. Such a device typically offers more and faster processing capabilities than the CPU of a Micro-Control Unit 121 like that used in the device 101. Unlike the Micro-Control Unit, program and data storage is external; and instead of specially configured ports, the μP 223 is typically configured to communicate data at relatively high speeds via one or more standardized interface buses, represented generally by the bus/arrow 224.

The lighting device includes one or more storage devices, which are accessible by the μP 223 via the bus 224. Although the lighting device 102 could include a hard disk drive or other type of disk drive type storage device, in the example, the device 102 includes one or more memories 225. Typical examples of memories 225 include read only memory (ROM), random access memory (RAM), flash memory and the like. In this example, the memory or memories 225 store executable programming for the μP 223 as well as data for processing by or resulting from processing of the μP 223.

Although a single bus 224 is shown for convenience, some implementations of the device 102 may include two three or more busses. A three bus implementation, for example, may include one bus for the communications, one for the hardware drivers, and one for the various sensors. Memory may have its own bus as well.

As noted, the lighting device 102 includes a source 111, which in the example of FIG. 5 is an integral part of the device 102. Power is supplied to the source 111 by an appropriate driver 231, in this example, included as a component on the control/communication (Ctrl./Comm.) board 219. Although represented as a single element in the drawing, the driver may comprise a number of elements offering several control channels for different elements of the light source 111. For example, a light emitting diode (LED) implementation of the light source 111 may have individually controlled LEDs or strings of LEDs; and for such an implementation, the driver 231 would consist of several driver circuits providing corresponding independent channels of control. The source driver 231 provides a source of power and associated control by the CPU, in this case by the μP 223, similar to the functions provided by the driver 131 in the device 101 of FIG. 4, except tat the driver 231 includes a bus interface that enables the μP 223 to communicate with the source driver 231 via the bus 224.

The lighting device 102 includes a power supply circuit 233 coupled to the AC mains 135, like the supply circuit in the example of FIG. 4, although the circuit 233 and the board 219 will be configured to supply diver voltage/current to the source driver 231 via the board instead of the separate path shown in the example of FIG. 4. As in the earlier example, the lighting device may be driven by a battery or other power source for a particular application, or an AC powered device 102 may have or connect to a back-up battery or the like to supply power for some period of time in the event of an interruption of power from the AC mains 135.

The source driver circuit 231 receives control commands from the μP 223 via the bus 224, to at least turn the source 111 ON/OFF. Depending on the particular type of source 111 and the associated driver 231, the μP 223 commands may control other characteristics of the source operation such as dimming of the light output, pulsing of the light output to/from different intensity levels, color characteristics of the light output, etc. If the source and/or driver circuit have the capability, the driver circuit 231 may also provide some information back as to the operation of the light source 111, e.g. to advise the μP 223 of the actual current operating state of the source 111.

As noted, the lighting device 102 includes external condition sensors 117 connected to standardized couplings 115 as wells as sensors 116 for sensing conditions related to operations of the source 112 and associated sensor couplings 118. The couplings 115, 118 provide physical connections, electrical signal connections and any power connections that may be necessary to the respective sensors 117, 116. Physical and electrical connection aspects of each coupling 115, 118 will conform to relevant aspects of the applicable sensor coupling standard(s). The electrical power and electrical signal communication from and/or to the sensors, in accordance with the electrical aspects of the applicable sensor coupling standard, are provided by appropriate input/output (I/O) circuitry connected between the coupling and the bus 224, much like in the earlier example of FIG. 4.

Hence, the lighting device 102 includes external sensor I/O circuitry 237 and source operation-related sensor I/O circuitry 239. With respect to the respective sensors and couplings, the I/O circuits are similar to the circuits 137 and 139 in the example of FIG. 4. However, each of the circuits 237 and 239 includes a bus interface that enables the μP 223 to communicate with the respective I/O interface circuit 237 or 239 via the bus 224. Each of the circuits 237 and 239 may be configured to provide the electrical interface for one, two or more of the respective sensors via the associated coupling(s).

The lighting device 102 also includes a communication interface 241, which is similar to the communication interface 141 in the earlier example, in that the communication interface 241 provides two way data communication via a network such as a LAN. In the example of FIG. 5, the communication interface 241 is of a type having a bus interface to enable the interface 241 to communicate internally with the μP 223 via the bus 224.

As noted, the lighting device 102 includes one or more memories 225 accessible via the bus 224; and those memories 225 store programming 243 for execution by the μP 223 as well as data to be processed or that has been processed by the μP 223. The programming 243 in this example may be generally the same as or similar to the programming 143 discussed above with regard to FIG. 4. Although optional, in this second example, the programming 243 does include an operating system (OS) 245. Like the earlier example, the programming 243 includes an application programming interface (API) 249, sensor type specific applications such as $AP_{s3}$ and $AP_{s4}$, and other application programming. However, here, the programming 243 (particularly OS 245 and API 249) is of a type written for the particular type of μP 223. The sensor type specific application programs $AP_{s3}$ and $AP_{s4}$ would be written to conform to the API 249 and to the particular types of sensors included in the lighting device 102.

Again, application programs, such as $AP_{s3}$, $AP_{s4}$, are examples of programming for execution by the processor that corresponds at least in part to the type(s) of sensors and controls at least one function of the processor responsive to the condition(s) sensed by the sensor(s). The μP 223 also will run one or more other application programs 247 from memory 225, to control various other functions of the lighting device 102, such as control of the light source 111, interaction with other types of sensors 116 or 117, and communications through the interface 241.

At least for the external condition sensors 117 and possibly for the source operation-related condition sensors 116, the API 249 provides the standard software interface of the OS to the application programs AP, as in the earlier example. The application programs AP and the API 245 also enable the µP 223 to communicate information or data generated in response to processing of signals or outputs of the sensors 117 so as to implement a standardized application programming interface with respect to the sensor related processing function(s). The resulting information in turn is communicated through the interface 241 and the network in a manner conforming to the standardized application programming interface. In this way, various devices 102 communicate data relating to conditions sensed by various types of sensors 117 and/or 118 through the network in a standardized format that can be readily processed by other equipment that is aware of the format supported by the application programming interface.

Each application program $AP_{s3}$ or $AP_{s4}$ corresponding to a particular type of sensor enables the µP 223 to receive data representing the condition sensed by the sensor 117 and controls one or more functions of the µP 223 responsive to the external condition or conditions sensed by the respective type of sensors, in a manner similar to the application programs AP in the earlier example.

Either as part of the OS 245 (if provided) or part of the other programming 247, the executable programming 243 for intelligent lighting device 102 includes programming that supports the resource sharing and distributed processing functions of the system 10. Such programming, for example, configures the processor CPU 223 in the intelligent lighting device 102 to make resources of the processor 223 and/or the memory 225 available for a distributed processing function via the communication interface 241 and the particular communications network. Such programming enables communications with other system elements to enable the resource manager 6 to determine or predict resource availability and allocate one or more tasks to available resources within the intelligent lighting device 102. The programming also enables the device 102 to receive instructions and data to be processed via the communication interface 241, perform the allocated processing task(s) and return processed data back up through the system for compilation at the resource manager 6.

The examples of FIGS. 3-5 utilized monitoring, control and communications elements that were substantially integrated with the fixture and fairly closely coupled to the light source of the fixture. In those examples, elements were provided that sensed conditions related to light source operation and could respond based on internal logic and/or commands from higher level control computers (e.g. to control the light source). However, other configurations are contemplated, for example, that may not utilize the elements on the board to control the light source, may provide additional output or control capability based on internal logic and/or commands from higher level control computers and/or to provide communication connectivity to other devices in the vicinity (e.g. for communication of other devices through the network(s) of FIG. 3). In many cases where there is an installed base of light fixtures, it may be practical to add a module providing monitoring and communication capabilities to each existing fixture to add the desired intelligence, etc.

FIGS. 6 and 7 relate to such an example of a lighting device 311 in which the monitoring and communication elements are implemented in a module 312 separate, which is attached to or mounted in the vicinity of a light fixture 313. However, the light fixture 313 in this example is a legacy fixture, and the elements within the module 312 do not control the light source 314 included with the associated fixture 313. The light fixture 313 and the module 312 together, in this example, form the lighting device 311. FIG. 6 shows the elements of the lighting device 311, whereas FIG. 7 is a block diagram illustration of the electronic elements of the monitoring and communication module 312.

The example of FIG. 6 utilizes a cobra-head type device as the light fixture 313. The cobra-head fixture is attached to a beam or arm 315 supported by a lamp post or light pole 316, although other mounting structures may be used. Light fixture implementations and mounting arrangements like those shown in FIG. 6 are common in street and parking lot applications. Of course, the monitoring and communication module 312 of FIG. 6 and FIG. 7 may be used with other types of legacy light fixtures and/or in other types of applications.

The light fixture 313 may include any light source 317 that is appropriate for the intended lighting application. The fixture includes a housing 318 that encloses the light source and other elements and provides the mechanical attachment to the supporting beam 315. The housing 318 also supports a transparent or diffusely transmissive cover 319 through which the source 317 emits light.

As in earlier examples, electrical power is obtained from alternating current (AC) mains 135, although the light source 317 may be driven by a battery or other power source for a particular application. AC power lines typically extend up through the pole 316 and the beam 315 and connect to the fixture 313, although such lines are omitted for ease of illustration.

The lighting device 311 also includes a controller 321 for controlling operation of the light source 317. The controller 321 could be external, but in the example, the housing 318 also encloses the controller 321.

Although other more sophisticated control functions may be provided by an appropriate implementation of the controller 321, for discussion purposes, we will assume that the controller simply switches power to the source 317 ON and OFF. Depending on the type of light source 317, the controller 321 may include power conversion circuitry such as a ballast or the like to convert the power obtained from the AC mains 135 to an appropriate voltage/current power for the particular light source 317.

The ON/OFF switching by the controller 321 may be based on a simple input switch, commands received from an external device via the power lines or another device, etc. In the example, the light fixture 313 includes a light sensing transducer 323, such as a photocell. The transducer 323 provides a signal that is related to the intensity of daylight reaching the transducer on the exterior of the fixture 313. The controller 321 in the example turns power to the light source 317 ON when the intensity of light detected by the transducer 323 falls to or below a threshold, e.g. to turn ON the source 317 as night is falling. Conversely, the controller 321 turns power to the light source 317 OFF when the intensity of light detected by the transducer 323 reaches a threshold, e.g. to turn OFF the source 317 as the sun rises in the morning. The source is kept ON in the dark of night, and the source is kept OFF during the daytime when sunlight is fairly plentiful.

In this example, the cobra head light fixture 313 is configured and operates in a conventional manner. The fixture may be an existing device that need not be modified, with respect to power and operational control.

In an implementation where the fixture 313 is a legacy device, the fixture is enhanced or upgraded by the addition of the monitoring and communication module 312. In the example, the module 312 is mounted by attachment to an underside surface of the housing 318 of the cobra head fixture 313. However, the module 312 may be added and mounted in association with the fixture 313 at any location and/or in any manner that is suitable for a particular installation and/or a particular application.

Existing light fixtures such as the fixture 313 have connection to power, represented by the AC mains 135 in the drawing. The module 312 could be supplied power in other ways from other sources, but typically, the module 312 will utilize the existing source of power available at the light fixture, eliminating the need for separate power and/or wiring. Hence, in the example, the module 312 connects to and obtains power from the AC mains already present in the lighting device for powering the light source 317. Although other connections may be used, e.g. depending on the location and/or mounting of the module 312, in the example, the module 312 has a connection to the AC main lines power 135 at a point in the housing of the cobra head light fixture 313.

The monitoring and communication module 312 is a layer L1 lighting device and communicates through a network with L1 layer computers, and data is processed and communicated with the higher layer networks/computers, in the hierarchical system 10 of FIG. 3. Since the networks and control computers of the hierarchy are the same as or similar to those in the earlier example, those system elements are omitted from the illustration and further discussion with respect to the example of FIGS. 6 and 7. With respect to FIG. 6, the simplified illustration shows a network link to/from the monitoring and communication module 312. This link may be wireless, although in the example it is a hard link such as a wire or optical network cable. Any suitable link may be used.

The monitoring and communication module 312 may perform sensor responsive monitoring and related communications only. However, for at least some system installations, it may be desirable to add further functional elements on or near the fixture that operate in some manner via the monitoring and communication module 312. In the example of FIGS. 6 and 7, the additional elements include a local wireless transceiver 325, such as a WiFi access point. The module 312 provides connectivity for the WiFi local wireless data transceiver 325 to the data network used by the module 312. In this way, the lighting device may provide a hotspot for Internet access or the like in the vicinity of the lighting device 311. By providing modules 312 and WiFi access points 325 on various street lamps around a city or enterprise campus, the city or campus can offer outdoor wireless Internet service, e.g. as a public service and/or for use by city or enterprise personnel.

The additional or ancillary devices provided in the vicinity of the light fixture may also include any of a wide range of devices that may be controlled via communications through the network and the monitoring and communication module 312 of the lighting device 311. Just by way of one example, such added equipment on one or more lighting devices 311 may be used to provide information to people in the vicinity of the fixture 313. Messages could be provided via the WiFi access point 325 to user data devices, or by a Bluetooth transceiver (not shown) for example to equipment in passing vehicles.

In the illustrated example, the additionally controlled equipment includes a visible message output device, such as a video monitor or digital sign board, represented generally by the video screen 327. The data network enables communications of commands and/or data to the module 312 to control information output via the video screen 327. The video screen 327, for example, may provide advertising or other information of general interest; or as shown by way of example, the screen may be used to provide a warning of danger or an announcement of instructions to the public in the vicinity of the lighting device 311.

The device 311 may also offer audible information output, and for that purpose, the exemplary device 311 also includes one or more loudspeakers 329. Much like for operation of the video screen 327, the data network enables communications of commands and/or data to the module 312 to control information output via the one or more loudspeakers 329, for any particular purpose deemed suitable by the service provider/operator of the system of FIG. 3.

Turing now to FIG. 7, we next consider an example of an implementation of the monitoring and communication module 312. The module 312 could be implemented using an MCU based architecture similar to that used in the example of FIG. 4. For purposes of an illustrative example for discussion here, however, FIG. 7 shows an architecture for the module 312 that is based on a microprocessor (μP) and bus architecture similar to that of the example of FIG. 5. Hence, elements shown in FIG. 7 that are the same as elements shown in the example of FIG. 5 use the same reference numerals and are discussed again here more briefly, since the reader should be familiar with or able to refer back to the earlier discussion of such elements for additional information regarding such similar elements.

The monitoring and communication module 312 includes a power supply circuit 233 coupled to the AC mains 135, like the supply circuit in the example of FIG. 5. As in the earlier examples, the module 312 may be driven by a battery or other power source for a particular application, or an AC powered device 312 may have or connect to a back-up battery or the like to supply power for some period of time in the event of an interruption of power from the AC mains 135.

The power supply circuit 233 provides appropriate power to drive the various elements on the control and communication board 331. The power supply circuit 233 may be mounted on the board 331 or a separate unit as shown.

The module 312 could use an MCU type architecture and software similar to that of the device 101 of FIG. 4. However, the processing and communications elements on the control/communication (Ctrl./Comm.) board 331, in the illustrated example, include a microprocessor (μP) 223, which serves as the programmable central processing unit (CPU) of the module 312, and thus the upgraded lighting device 311. The μP 223 is configured to communicate data via one or more standardized interface buses, represented generally by the bus/arrow 224. The monitoring and communication module 312 also includes one or more storage devices, which are accessible by the μP 223 via the bus 224. Although the module 312 could include a hard disk drive or other type of disk drive type storage device, in the example, the device 102 includes one or more memories 22, such as ROM, RAM, flash memory or the like. In this example, the memory or memories 225 store executable programming for the μP 223 as well as data for processing by or resulting from processing of the μP 223. Although not shown in this latest drawing for convenience, the programming stored in the memory or memories 225 may include an operating system (OS) and includes an API, application programs (AP) for use with specific sensors, and the like, similar to the programming 243 of the device 102 discussed above with regard to FIG. 5. As in the examples of FIGS. 4 and 5, the programming also configures the μP 223 so that the intelligent lighting device 311 participates in the resource sharing for distributed processing service.

The monitoring and communication module 312 also includes a communication interface 241, which is similar to the communication interfaces in the earlier examples, in that the communication interface 241 provides two way data communication via an external network such as a LAN. In the example of FIG. 7, like that of FIG. 5, the communication interface 241 is of a type having a bus interface to enable the interface 241 to communicate internally with the μP 223 via the bus 224.

In this example (FIGS. 6 and 7), the monitoring and communication module 312 also supports local wireless communication. As noted in the discussion of FIG. 6, the specific example uses a WiFi type wireless access point transceiver 325 for local wireless data communication with data devices in the vicinity of the intelligent lighting device 311. Hence, the monitoring and communication module 312 includes a second communication interface 333. The interface 333 would be of a standard type configured for local communications with the particular type of device 325. In the example WiFi type example of these drawings, the second communication interface 333 would typically be an Ethernet type LAN interface. An Ethernet capable would provide a connection from the interface 333 in the module 312 to the WiFi type wireless access point 325. Like the interface 241, the second communication interface 333 is of a type having a bus interface to enable the interface 325 to communicate internally with the μP 223 and/or the interface or other elements of the board 331 via the bus 224. For example, under control of the μP 223 when executing programming from the memory or memories 225, the interfaces 333 and 241 may provide two-way data communications for devices utilizing the WiFi type wireless access point 325 to access the Internet. The WiFi type wireless access point 325 and the second communication interface 333 may also enable data devices in the vicinity (with appropriate access privileges) to access the μP 223, e.g. to obtain monitoring data, module operational information or the like and/or to provide control commands and/or new programming to the module 312.

As in the lighting devices in the earlier examples, the lighting device 311 includes external condition sensors 117 connected to standardized couplings 115. In this case the couplings 115 are part of the module 312; and the sensors 117 are attached to and supported together with the module 312. The couplings/sensors could be mounted separately and connected to the module 312. The couplings 115 provide physical connections, electrical signal connections and any power connections that may be necessary to the external condition sensors 117. Physical and electrical connection aspects of each coupling 115 will conform to relevant aspects of the applicable sensor coupling standard(s). The electrical power and electrical signal communication from and/or to the sensors 117, in accordance with the electrical aspects of the applicable sensor coupling standard, are provided by appropriate input/output (I/O) circuitry 237 connected between the coupling and the bus 224, as in the earlier example of FIG. 5. The external sensor I/O circuitry 237 includes a bus interface that enables the μP 223 to communicate with the respective I/O interface circuit 237 via the bus 224. The external sensor I/O circuitry 237 may be configured to provide the electrical interface for one, two or more of the sensors 117 via the associated coupling(s).

Although not shown in this example, the monitoring and communication module 312 may include one or more sensors and associated couplings the same as or the sensors 116 and couplings 118 for sensing one or more conditions that relate to operation of the light source. In such a case, the communication module 312 would also include source operation-related sensor I/O circuitry similar to circuitry 239 in the example of FIG. 5. Although the module 312 does not control the source operation of the fixture 313, the information obtained by such additional sensing may be reported to the higher layer control computers as it may be useful in some system applications, e.g. to report on how well or poorly particular light fixtures are operating.

As noted in the discussion of FIG. 6, the intelligent lighting device 311 may support communication with and/or control of additional or ancillary devices provided in the vicinity of the light fixture 313. Although a wide range of such additional or ancillary devices may be provided for various applications of the device 311 in the context of a particular service provided by the system of FIG. 3, the specific example provided a video screen 327 and loudspeakers 329 for local information output. The monitoring and communication module 312 of the device 311 will include one or more drivers for communication with and/or control of any additional devices included in or associated with device 311. Hence, in this example, monitoring and communication module 312 includes one or more bus connected audio and/or video (A/V) drivers 335. Depending on the form/standard of the link to the video screen 327 and loudspeakers 329, the module may use a single combined driver or two separate drivers. The A/V driver(s) may be similar to drivers used in personal computers to drive an external monitor and speakers. Each driver 335 is of a type having a bus interface to enable the interface 335 to communicate internally with the μP 223 and/or other elements of the board 331 via the bus 224. For example, the module 312 may receive commands to provide audio and/or video output as well as the desired information content in packetized form via the network. The μP 223 controls the driver(s) 335 to cause the video screen 327 and loudspeakers 329 to provide outputs, and the driver(s) convert the received content to appropriate format signals so that the content is output in a presentable form as audio and video via the video screen 327 and loudspeakers 329.

The program memory for storing executable programming often is the memory on the control and communication board (either within the MCU or coupled to the μP via the bus in our three examples, FIGS. 4, 5 and 7). As outlined earlier, the exemplary sensors 116, 117 include at least some circuitry for processing the output of the transducers included as part of the sensors. In such a sensor, the circuitry receives the signal from the transducer(s) in the sensor and produces an output via the coupling that conforms to the signaling aspects of the sensor coupling standard, e.g. as a standard analog level signal on one or more pins designated for an analog connection and/or as appropriately formatted data on the pins designated for data outputs. The sensor circuitry may also receive standard control signals, e.g. digital command signals, over designated for data inputs to the sensor. Many implementations of such sensors will include a programmable processor, and some sensor configurations may include memory. If included as part of the sensor, the memory may contain the applications program (AP) for the relevant type of sensor. In such a case, the CPU may directly access the program in the sensor memory, or the application program AP may be uploaded from the sensor memory to the appropriate memory on the control and communication board.

The structure and operation of the intelligent lighting devices 101, 102 and 311, as outlined above, were described by way of example, only.

As shown by the above discussion, various higher layer control computer functions and resource manager functions may be implemented on various computers connected for data communication via the components of a local or wide area network as shown in FIGS. 1 and 3. Although special purpose devices may be used, such devices also may be implemented using one or more hardware platforms intended to represent any of the various available types of general purposes programmable devices, albeit with an appropriate network connection for data communication and appropriate programming to implement the functions discussed herein.

FIGS. 6, 7 and 8 provide functional block diagram illustrations of general purpose computer hardware platforms. FIG. 6 illustrates a network or host computer platform, as may typically be used to implement a host or server, such as one of the computers 4, 6, 13A, 13B, 23A, 23B or 27. FIG. 7 depicts a computer with user interface elements, as may be used to implement a personal computer or other type of work station or terminal device, such as one of the computers 7, 15A or 29, although the computer of FIG. 7 may also act as a server if appropriately programmed. The computer of FIG. 8 represents an example of a mobile device, such as a tablet computer, smartphone or the like with a network interface to a wireless link. It is believed that those skilled in the art are familiar with the structure, programming and general operation of such computer equipment and as a result the drawings should be self-explanatory.

A server (see e.g. FIG. 8), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, e.g. to distribute the processing load and/or improve system reliability.

Also, a computer configured as a server with respect to one layer or function may be configured as a client of a server in a different layer and/or for a different function. For example, the intelligent lighting devices 11 may operate as client devices of server functions implemented by L2 computers such as 13A and 13B, whereas the same L2 computers 13A and 13B may function as clients with respect to at least some of the higher layer computers such as resource manager 6 or a higher layer control computer 23A or 23B. Similarly, computers such as 23A, 23B that function as servers with respect to computers in the lower layer may be configured as client devices with respect to higher layer computer(s) such 6 or 27 configured as servers. If more effective for a particular system application, client-server arrangement outlined above could be inverted, so that the higher layer computers would be configured as clients with respect to server-configured computers in the next lower layer. Also, terminal devices often are configured as client devices.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 9). A mobile device (see FIG. 10) type user terminal may include similar elements, but will typically use smaller components that also require less power, to facilitate implementation in a portable form factor. The example of FIG. 10 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer of FIG. 9 is shown by way of example as using a RAM type main memory and a hard disk drive for mass storage of data and programming, whereas the mobile device of FIG. 10 includes a flash memory and may include other miniature memory devices.

The various types of user terminal devices will also include various user input and output elements. A computer, for example, may include a keyboard and a cursor control/selection device such as a mouse, trackball, joystick or touchpad; and a display for visual outputs (see FIG. 9). The mobile device example in FIG. 10 utilizes a touchscreen type display, where the display is controlled by a display driver; and user touching of the screen is detected by a touch sense controller (Ctrlr).

The hardware elements, operating systems and programming languages of such user terminal devices also are conventional in nature, and it is presumed that those skilled in the art are adequately familiar therewith.

Of note for purposes of this discussion, each type of computerized server or user terminal device will store and execute programming, including an operating system (OS) appropriate to the particular device and one or more application programs (APs). The programming may also implement an application programming interface (API) that allows the application programs to execute through the OS on the processor(s) that function as the device CPU. At least some of the application programs (APs) are specifically written to configure the respective computerized device to implement the functions of resource manager and/or the L2 to L4 layer computers of the system 10, as described herein.

In several examples, the intelligence and sensors are integrated with or attached to the fixture or other element that incorporates the light source. However, for some installations, there may be some separation between the fixture or other element that incorporates the light source and the electronic components that provide the intelligence and communication capabilities. Also, in the examples, the sensors are incorporated in the fixture or module that houses the electronic components that provide the intelligence and communication capabilities. However, depending on the condition(s) to be sensed and/or the particular installation, the sensors and standardized couplings may be mounted somewhat separately and connected or otherwise coupled to the electronic components that provide the intelligence and communication capabilities.

The monitoring and communications elements may be applied to or combined with any type of light source. Hence, the intelligent lighting devices may be any desirable type of indoor or outdoor lighting device, signal lighting devices such as traffic lights, lighted signage, etc. A system like that of FIG. 1 or FIG. 3 may include within the one system any number of these different types of lighting devices. A system operated by a city or municipality, for example, might add intelligence to street lights of various types, traffic lights and various types of indoor building lights in buildings used by the government. A system operated by a state or country might add intelligence to lights of the types mentioned with regard to the city, in each city or town of the state or country as well as to highway lights and sign lighting along roads, streets and highways between cities and towns in the jurisdiction. The broader the coverage, the more varied the types of lighting devices that are likely to be included in the system.

A system run by a private enterprise, either to monitor its own premises or to provide monitoring and the like as services to its customers might install intelligent lighting devices or add intelligent modules like that of FIG. 7, for indoor and outdoor lighting applications as various types of lighting devices on private property. If such an enterprise sells the services to a government, then the enterprise would install and operate a system like that described earlier for a city, state or country. One service provider enterprise might also sell the services both to government and to private parties, essentially resulting in an overall system that includes both government and private installations of the intelligent lighting devices and could combine data from all of the intelligent lighting devices.

Aspects of the distributed processing using available resources of network of intelligent lighting devices as well as aspects of the core lighting and/or monitoring functions, as outlined above, also may be embodied in programming for the resource manager and/or other components of the overall system. Program aspects of such technology may be thought of as "products" or "articles of manufacture" typically in the form of executable code and/or associated data that is carried programming on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the programming. All or portions of the programming may at times be communicated through the networks used by the system, by the public Internet or various other telecommunication networks. Such communications, for example, may enable loading of the programming from one computer or processor into another, for example, from a management server or host computer of the entity operating the networked lighting devices into the computer platform of the resource manager, the control computer(s) and/or the intelligent lighting devices. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) lighting devices or the like, shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Many of these forms of computer readable media store the programming within the particular system components and/or may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising: lighting devices, each lighting device comprising:
    (A) a light source;
    (B) a communication interface, configured to enable communication through a communications network;
    (C) a processor having access to the communication interface;
    (D) a memory accessible to the processor;
    (E) one or more programs stored in the memory, wherein execution of the one or more programs configures the processor to: (i) perform at least one of a core monitoring function and a core function related to operation of the light source, (ii) to communicate regarding the one or more core functions via the communication interface, and (iii) make resources of the processor and/or the memory available via the communication interface for a distributed processing function, other than the one or more core functions;
    at least one computer having a communications interface and configured to communicate through the communications network with the lighting devices so as to receive information from and/or send information to the processors of the lighting devices with regard to the one or more core functions; and
    a resource manager coupled to communicate through the communications network with the lighting devices and configured to:
    (a) receive a job for distributed processing, the received job being unrelated to light emissions of the lighting devices;
    (b) determine resources of the processors and/or the memories are available in identified ones of the lighting devices for distributed processing of the received job;
    (c) distribute tasks and/or data of the received job through the communications network to the identified lighting devices, for distributed processing in the identified lighting devices;

(d) receive, from the identified lighting devices through the communications network, results of distributed processing for the received job utilizing the available resources; and (e) process the received results to produce a composite result for a response to the received job.

2. The system of claim 1, wherein each respective one of at least a plurality of the lighting devices further comprises:

a sensor coupling, configured to present a sensor connection interface standardized across the plurality of the lighting devices, the standardized connection interface being compatible with a plurality of different types of sensors;

a sensor connected to the standardized connection interface of the sensor coupling, the sensor being of one of the types and located so as to sense one of a plurality of conditions not directly related to operational performance of the light source, the sensor being configured to output a signal responsive to the one sensed condition via the standardized connection interface of the sensor coupling; and a program corresponding at least in part to the one type of the sensor for controlling at least one function of the processor of the respective lighting device responsive to the condition sensed by the sensor and for causing the processor of the respective lighting device to implement a standardized application programming interface with respect to the at least one function.

3. The system of claim 1, wherein the at least one computer comprises:

first layer computers having communications interfaces, wherein each first layer computer is configured to communicate through the communications network with a different respective group of the lighting devices so as to receive information from the processors of the respective group of the lighting devices regarding a core function and is configured to process the received information to obtain resultant information regarding the core function; and a second layer computer having a communications interface to communicate through a communications network to receive the resultant information from the first layer computers, wherein the second layer computer is configured to initiate at least one action in response to processing of the resultant information received from the first layer computers.

4. The system of claim 1, wherein the resource manager is configured to perform the determination that resources of the processors and/or the memories of lighting devices are available in response to communications the resource manager receives from lighting devices.

5. The system of claim 1, wherein the resource manager is configured to perform the determination that resources of the processors and/or the memories of lighting devices are available in response to communications the resource manager receives from the at least one computer.

6. The system of claim 1, wherein the least one computer is further configured to also make processor and/or memory resources of the least one computer available for the distributed processing function.

7. A method, comprising steps of:

(a) receiving a job for distributed processing via resources of networked lighting devices available for a distributed processing function, wherein:

the distributed processing function is different from any monitoring function and lighting function of the networked lighting devices; and the received job is unrelated to light emissions of the networked lighting devices;

(b) processing received information about the networked lighting devices to determine availability of processor and/or memory resources of an identified number of the networked lighting devices;

(c) distributing tasks and/or data of the received job through a communications network to the identified lighting devices, for distributed processing in the identified lighting devices;

(d) receiving, from the identified lighting devices through the communications network, results of distributed processing for the received job utilizing the available resources; and (e) processing the received results to produce a composite result for a response to the received job.

8. The method of claim 7, further comprising:

authenticating a source of the received job, wherein at least the step (c) of distributing tasks and/or data of the received job is dependent upon the authentication of the source of the received job.

9. The method of claim 7, further comprising:

repeating steps (a) through (e) with respect to another received job, wherein the order of performing the steps with respect to the two received jobs is based on relative priorities associated with the two received jobs.

10. An apparatus, comprising:

at least one computer, each comprising a communication interface configured to enable communication through a communications network, a processor, and a storage device accessible to the processor; and a resource manager program in at least one storage device, wherein execution of the resource manager program configures the at least one computer such that the apparatus performs functions, including functions to:

(a) receive a job for distributed processing via resources of networked lighting devices available for a distributed processing function, wherein:

the distributed processing function is different from any monitoring function and lighting function of the networked lighting devices; and the received job is unrelated to light emissions of the networked lighting devices;

(b) process received information about the networked lighting devices to determine availability of processor and/or memory resources of an identified number of the networked lighting devices;

(c) distribute tasks and/or data of the received job through the communications network to the identified lighting devices, for distributed processing in the identified lighting devices;

(d) receive, from the identified lighting devices through the communications network, results of distributed processing for the received job utilizing available resources; and (e) process the received results to produce a composite result for a response to the received job.

11. The apparatus of claim 10, wherein execution of the resource manager program further configures the at least one computer to receive the information from the networked lighting devices.

12. The apparatus of claim 10, wherein execution of the resource manager program further configures the at least one computer to receive the information about the networked lighting devices from a computer in communication with the networked lighting devices with regard to one or more lighting or monitoring functions of the networked lighting devices.

13. The apparatus of claim 10, wherein execution of the resource manager program further configures the at least one computer to authenticate a source of the received job at least before implementing the distribution of the tasks and/or data of the received job to the identified lighting devices.

14. The apparatus of claim 10, wherein execution of the resource manager program further configures the at least one computer to determine relative priorities for a plurality of received jobs and perform the functions with respect to the received jobs in an order based on the relative priorities.

15. An article of manufacture comprising a non-transitory machine readable storage medium and a program embodied in the medium, wherein execution of the program by a processor of a computer having an interface to a communications network configures the computer to perform functions, including functions to:

(a) receive a job for distributed processing via resources of networked lighting devices available for a distributed processing function, wherein:

the distributed processing function is different from any monitoring function and lighting function of the networked lighting devices; and the received job is unrelated to light emissions of the networked lighting devices;

(b) process received information about the networked lighting devices to determine availability of processor and/or memory resources of an identified number of the networked lighting devices;

(c) distribute tasks and/or data of the received job through the communications network to the identified lighting devices, for distributed processing in the identified lighting devices;

(d) receive, from the identified lighting devices through the communications network, results of distributed processing for the received job utilizing available resources; and (e) process the received results to produce a composite result for a response to the received job.

\* \* \* \* \*